United States Patent
Parigger

(10) Patent No.: US 6,169,950 B1
(45) Date of Patent: Jan. 2, 2001

(54) METHOD FOR CONTROLLING A VEHICLE DRIVE UNIT HAVING A CONTINUOUSLY VARIABLE TRANSMISSION

(75) Inventor: Martin Parigger, Eggersdorf (AT)

(73) Assignee: Steyr-Daimler-Puch Aktiengesellschaft, Vienna (AT)

( * ) Notice: Under 35 U.S.C. 154(b), the term of this patent shall be extended for 0 days.

(21) Appl. No.: 09/339,641

(22) Filed: Jun. 24, 1999

(30) Foreign Application Priority Data

Jun. 25, 1998 (EP) .................................................. 98890183

(51) Int. Cl.⁷ ............................ B60K 41/04; F16H 59/06
(52) U.S. Cl. .................................. 701/53; 701/56; 477/46
(58) Field of Search ............................... 701/51, 53, 54, 701/55, 56, 67; 477/37, 43, 46, 48

(56) References Cited

U.S. PATENT DOCUMENTS 6,066,069 * 5/2000 Vorndran ................................. 477/38

FOREIGN PATENT DOCUMENTS 2811574  9/1979  (DE) .
4430447  2/1996  (DE) .
19631070  2/1998  (DE) .

* cited by examiner

Primary Examiner—Tan Nguyen
(74) Attorney, Agent, or Firm—Bachman & LaPointe, P.C.

(57) ABSTRACT

A method for controlling a vehicle drive unit, which comprises a drive engine and a transmission with a continuously variable gear ratio, comprises the following steps:

a) the required vehicle acceleration (ASOLL) is calculated from a throttle control lever position (XFP, XHG) and the current speed of travel (VFZ), b) a required transmission variation (IGDSOLL1) is calculated from the required vehicle acceleration (ASOLL) and the current rotation speed (NMOT) of the drive engine, c) a limited required transmission variation (IGDSOLL) is determined from the required transmission variation (IGDSOLL1) such that the engine rotation speed (NMOT) does not fall below a value which depends on the position of the power control element (XEP) of the drive engine, d) the continuously variable transmission is varied in accordance with (IGDSOLL);

e) the actuation parameter (XEPSOLL) for the power control element of the drive engine is obtained directly from the throttle control lever position (XFP, XHG).

11 Claims, 13 Drawing Sheets

METHOD FOR CONTROLLING A VEHICLE DRIVE UNIT HAVING A CONTINUOUSLY VARIABLE TRANSMISSION

BACKGROUND OF THE INVENTION

The invention relates to a method for controlling a vehicle drive unit comprising a drive engine and a transmission having a continuously variable gear ratio, in the case of which method command signals and state signals are used to generate control signals for the drive engine and for the transmission, with a required gradient being determined for the transmission gear ratio.

Such a method is known, for example, from DE 196 31 070 A1. In this method, lower and upper limit values are first of all generated from the speed of travel of the vehicle, acceleration limit values are then determined from this and from the current acceleration, and these acceleration limit values are compared with an acceleration desired by the driver, resulting in a required acceleration. The acceleration requirement is then distributed between the variation of the transmission and of the drive engine. However, owing to the capability to vary the engine and transmission continuously, and owing to the mutual relationships, this distribution is a particularly difficult problem; particularly if an auxiliary drive which is independent of vehicle speed—for example the power takeoff shaft of a tractor—also has to be provided.

An attempt to solve this problem is known from U.S. Pat. No. 5,575,737. There, on the one hand, the transmission gear ratio is varied in proportion to a drop in the rotation speed of the engine and, on the other hand, the engine rotation speed is varied with a constant gear ratio in alternate steps, until the initial wheel rotation speed is achieved again. No indication is given as to how it is in this way possible to achieve a control process that is continuous, stable and, above all, optimum for the engine. This document also does not solve the problem of converting the driver's demand, entered for example via a throttle control pedal, such that the vehicle responds to this demand without any time delay or unpredictable reactions.

This problem is also addressed in DE 28 11 574, without being limited to continuously variable transmissions. There, the transmission gear ratio is set to match the required power on the basis of a family of transmission characteristics, in a first control loop, and a control parameter for the drive engine is set, in a second control loop, as a function of the resultant engine rotation speed, in accordance with a family of engine characteristics. In the case of a continuously variable transmission, this allows the engine to be managed in its optimum operating range and with an approximately constant engine rotation speed only within a narrow range around a medium load, and there are no measures to prevent interactions between the transmission control and engine control ("hunting").

The invention is thus based on the object of proposing a control method of this generic type which satisfies all the requirements; operation of the engine in the best range, direct and appropriate response to the driver's demand, easy adaptability of the transmission to various vehicle and drive engine requirements, easy adaptability of the drive engine to the control process, and a largely constant engine rotation speed for driving a power takeoff shaft. In particular, operation of the engine in the best range is subject to satisfaction of the following requirements:

best overall efficiency, no reduction in the engine rotation speed below the respective operating point defined as the optimum (for example the point with the maximum injection rate in the case of an RQV controller)

no engine stalling when overloaded full utilization of the engine power when required sufficiently fast development of the engine power in response to a dynamic requirement (kick down)

no adverse effects on the driver's demand requirements when the engine is operating on partial load

SUMMARY OF THE INVENTION

According to the invention, the foregoing object is achieved by the following method:

I. A method for controlling a vehicle drive unit comprising a drive engine and a transmission having a continuously variable gear ratio, in the case of which method command signals and state signals are used to generate control signals for the drive engine and for the transmission, with a required gradient being determined for the transmission gear ratio, distinguished by the sequence of the following steps:
(a) the required vehicle acceleration (ASOLL) and the output drive rotation speed gradient (NABDSOLL) are calculated from a throttle control lever position (XFP, XHG) and the current speed of travel (VFZ) by means of a family of characteristics (#ASOLLF, #ASOLLR),
(b) a required transmission variation (IGDSOLL1) is calculated from the required vehicle acceleration (ASOLL) and the current rotation speed (NMOT) of the drive engine,
(c) a limited required transmission variation (IGDSOLL) is determined from the required transmission variation (IGDSOLL1) such that the engine rotation speed (NMOT) does not fall below a value which is a function (NMOTMMAX) of the position of the power control element (XEP) of the drive engine,
(d) the continuously variable transmission is varied in accordance with (IGDSOLL);
(e) the actuation parameter (XEPSOLL) for the power control element of the drive engine is obtained directly from the throttle control lever position (XFP, XHG).

Although the solution comprises the interaction of all these steps, the effects of the individual steps can be explained as follows:

With regard to step I(a) above: The required vehicle acceleration and the output drive rotation speed gradient are calculated directly from the throttle control lever position and the current speed of travel by means of a family of characteristics. As a result of the fact that a family of characteristics is first of all used in its simplest form, without taking account of engine-specific optimization actions and limit values, an uncorrupted value for the required vehicle acceleration is obtained in all circumstances. This is a major advantage in the subsequent steps, and, in particular, it improves the response when the throttle control lever is operated. Furthermore, the single family of acceleration characteristics can also be replaced, in operation, by a different, stored family of characteristics.

With regard to step I(b) above: The direct conversion of the required vehicle acceleration into a required transmission variation, without this being split between a transmission variation and an engine variation, avoids reactions, and there is thus no oscillation between transmission control and engine control, with full consideration being given to dynamic requirements while driving. When the throttle control pedal is operated, there is a direct vehicle feel, and the vehicle "responds to the gas".

With regard to step I(c) above: The required transmission variation is limited such that the engine rotation speed does not fall below a value which is a function of the position of the power control element of the drive engine. The required transmission variation is thus not limited until it is available precisely, and is not carried out as a precautionary measure several steps in advance. In this case, the limits are purely engine-related. This avoids the disadvantages of splitting between transmission variation and engine variation. The limiting of the required transmission variation only prevents any changes in the load on the engine which the engine control module cannot compensate for and which could lead to revving or stalling of the engine. For simplicity, this can be referred to as engine strain control. This comes into effect when the set transmission gear ratio and/or variation rate is too high for the currently available engine power to overcome the resistance to motion that is present. The strain control then limits or reverses the transmission variation, and thus relieves the load on the engine. Furthermore, this can force the transmission gear ratio to be reduced when the throttle is open quickly (kick down), so that the engine rotation speed can follow the control rod position to the optimum operating point.

With regard to step I(d) above: The gear ratio of the continuously variable transmission is varied in accordance with the limited required transmission variation thus, so to speak, taking care of the engine without acting on its control system. The engine-related limiting also results in changes in the load on any power takeoff shaft that may be present being given full consideration without any additional measures.

With regard to step I(e) above: Step (c) allows the actuation parameter for the power control device of the drive engine to be calculated directly from the throttle control lever position and, together with this, results in rapid response and in the drive unit having an appropriate response. This has the major advantage that, firstly, the engine control system is not acted on directly, so that engines which are used in conjunction with conventional transmissions can be used without any change to their control elements, and secondly that the engine control system remains entirely independent of the transmission control system. This completely solves the problem of simultaneously controlling the engine and continuously variable transmission without "hunting" or "oscillating", in a surprisingly simple manner.

When the drive unit is used in an agricultural tractor, it is possible to make use of the capability to call up different families of characteristics selectively in order to provide a crawler gear. To do this, the required vehicle acceleration is calculated by means of further families of characteristics or calculation functions which are called up on the basis of command signals. Furthermore, it is possible to use the capability to call up different families of characteristics or functions selectively, in order to achieve a Tempomat function. The inclusion of such families of characteristics at an early stage in the method sequence simplifies the control measures linked to them, and the command signal for calling the corresponding function can be appropriately activated by a mode selection lever, using which the crawler gear is also activated.

The drive engine is preferably a diesel engine having a control rod as the power control element, in which case its actuation parameter is the required position of the control rod. The throttle control lever position is thus converted directly from the actuating mechanism for this diesel engine to a control rod position which—in the case of an agricultural tractor with an RQV controller—is converted to an injection flow rate to ensure that the rotation speed fluctuates as little as possible. When a diesel engine is used, this also results in rapid response, and the drive unit having an appropriate response.

When the drive unit is used in a tractor having a power takeoff shaft, a throttle control pedal and a manual throttle control are advantageously provided as the throttle control lever. In a development of the method according to the invention, when the manual throttle control is activated, its position determines only the actuation parameter for the drive engine, and the position of the throttle control pedal determines only any variation of the transmission gear ratio. It is thus possible to use the throttle control pedal to vary the speed of travel on its own, and operation of the manual throttle control to vary the speed of travel and the power takeoff shaft rotation speed.

For other applications it is advantageous to consider the gradient of the rotation speed of the drive engine as well when taking account of the current rotation speed of the drive engine when determining the required transmission variation. This improves, in particular, the response in high-speed road vehicles, but necessitates further measures to avoid instabilities.

In a development of the invention, a Tempomat function can also be provided. When the Tempomat function is switched on, the current speed of the vehicle is stored as a required value and, as a consequence of this, the required vehicle acceleration and the output drive rotation speed gradient are calculated as a function of the speed error, and the required transmission variation is calculated from this.

In a development of the method according to the invention, a stationary position control process can be carried out with particular advantage in that, after defining the required stationary position of the vehicle by initialization, the error in the vehicle position from the required stationary position of the vehicle is determined by integration of the output drive rotation speed, and a required output drive rotation speed gradient is then calculated from the error from the required stationary position of the vehicle, by means of a function. The value of the integral is regulated to zero by varying the transmission gear ratio. Limiting the integral to a specific value—which corresponds to a distance—results in the required position of the vehicle position being readjusted in the event of major errors. In particular, this makes it possible to avoid the vehicle creeping back to the required position again after an unintended major error from the original required position.

The sequence for limiting the required transmission variation according to the step I(c) is carried out, in an advantageous development, according to the following method:

II. The method wherein the required transmission variation (IGDSOLL) limiting is carried out in the following steps:
    (a) the engine rotation speed (NMOTMMAX) which corresponds to the desired engine operating point and which should not be undershot is calculated from the position of the power control element of the drive engine (XEP) by means of a function (#FNXEPNMOT).
    (b) a control error (DNMOT) is formed from the current engine rotation speed (NMOT) and the desired engine rotation speed (NMOTMMAX),
    (c) a required engine rotation speed gradient (NMOTDMIN; NMOTDMIN1) is determined from the control error (DNMOT) using a predetermined function (#FNNMOTDMIN1), (d) a gradient control error (DNMOTDMIN) is determined from the actual engine rotation speed gradient (DNMOT) and the required engine rotation speed gradient (NMOTDMIN; NMOTDMIN1), and a limit value for the first derivative of the required transmission variation (IGDDSOLLLIM) is calculated from this using a function (#FNIGDDLIM), and is used for limiting, (e) the limit value (IGDSOLLLIM1) is calculated from the required transmission variation (IGDDSOLLLIM) by integration, and (IGDSOLL1) is then limited to a maximum value of (IGDSOLLLIM1).

With regard to step II(a) above: The function by means of which the engine rotation speed corresponding to the desired engine operating point is calculated from the position of the power control element indicates the optimum operating points of the engine, thus including the engine-related optimization, for example the rotation speed for maximum engine torque or minimum consumption. This should not be undershot. Various functions may also be selected.

With regard to step II(b) above: The control error is thus defined as the difference between the current engine rotation speed and the engine rotation speed at the optimum point for the given engine actuation parameter. A primary control aim is to prevent the engine rotation speed being less than the optimum.

With regard to step II(c) above: A required engine rotation speed gradient is determined from this control error using a predetermined function, and this gradient is intended to be used to change the engine rotation speed to the optimum point. This required gradient is the secondary control aim. This has the advantage that the control characteristic can be adapted directly, in terms of the subjective vehicle feel. Particularly when the throttle control pedal has been kicked down, or if the resistance to motion increases suddenly, monitoring of the rotation speed gradient allows any interruption in traction force to be suppressed (by consuming power for acceleration of the engine).

With regard to step II(d) above: Since a secondary control aim is to prevent the required engine rotation speed gradient from being undershot, the control error is first of all formed from the required engine rotation speed gradient and the measured engine rotation speed gradient, and this is used to calculate a differential derivative of the required transmission variation, on the basis of a function, which is then used for limiting. In particular, the gradient of the engine rotation speed is equal to the gradient of the transmission input rotation speed. The derivative of the required transmission variation corresponds to an acceleration change which is perceived as a jerk and thus has a major effect on the vehicle feel. Direct limiting of the transmission gear ratio change is not sufficient for this purpose. The required engine rotation speed gradient can also be limited by the following method:

III. The method wherein, in addition to step II(c), the following steps:

(a) a minimum engine rotation speed (NMOTMIN) is determined as a predetermined function (#FNNMOTMIN) of the transmission gear ratio (IG) or of the vehicle speed VFZ, (b) a rotation speed error ((downward)) (NMOT-NMOTMIN) is formed from the current engine rotation speed (NMOT) and the minimum engine rotation speed (NMOTMIN), (c) an engine rotation speed gradient (NMOTDMIN2) is formed from the control error (NMOT-NMOTMIN) using a further predetermined function (#FNNMOTDMIN2), (d) the greater of the two engine rotation speed gradients (NMOTDMIN1, NMOTDMIN2) is selected as the final engine rotation speed gradient.

With regard to step II(e): The limited required transmission variation (IGDSOLL) is then obtained by comparison (minimum select) with the upper limit values. This allows a number of limit values to be taken into account.

In a further development of the method II, step (c) above, a procedure according to method III, above is also advantageous, in order to determine a second required motor rotation speed gradient, limiting of which is intended to prevent the engine from stalling, and to prevent the engine undershooting a minimum engine rotation speed at relatively high transmission gear ratios. The minimum engine rotation speed may be calculated, for example, as a function of the transmission gear ratio, such that the minimum engine rotation speed is no longer reduced, from a specific gear ratio. A further minimum engine rotation speed gradient is then formed from the difference between the engine rotation speed and the minimum engine rotation speed, and this gradient can be selected to limit the transmission gear ratio change.

Finally, in a refinement of the method, the required transmission variation (IGDSOLL1) can also be reduced when the range boundaries are approached, and the output drive rotation speed (NAB) can be determined from rotation speeds of elements of the summing epicyclic transmission.

BRIEF DESCRIPTION OF THE DRAWINGS

The method according to the invention will be described in the following text with reference to schematic diagrams and graphs of an exemplary embodiment, in which:

in FIG. 3B for a different operating mode, in FIG. 3B, and relating to FIG. 4, FIG. 10: shows a diagram relating to field 3.2.2. in FIG. 3B, and relating to FIG. 4, FIG. 11: shows a diagram relating to field 3.3.2. in FIG. 3B, and relating to FIG. 4, FIG. 12: shows a diagram relating to field 3.3.2. in FIG. 3B, and relating to FIG. 4, FIG. 13: shows a diagram relating to field 5.1. in FIG. 3D.

DETAILED DESCRIPTION

Figure 1:
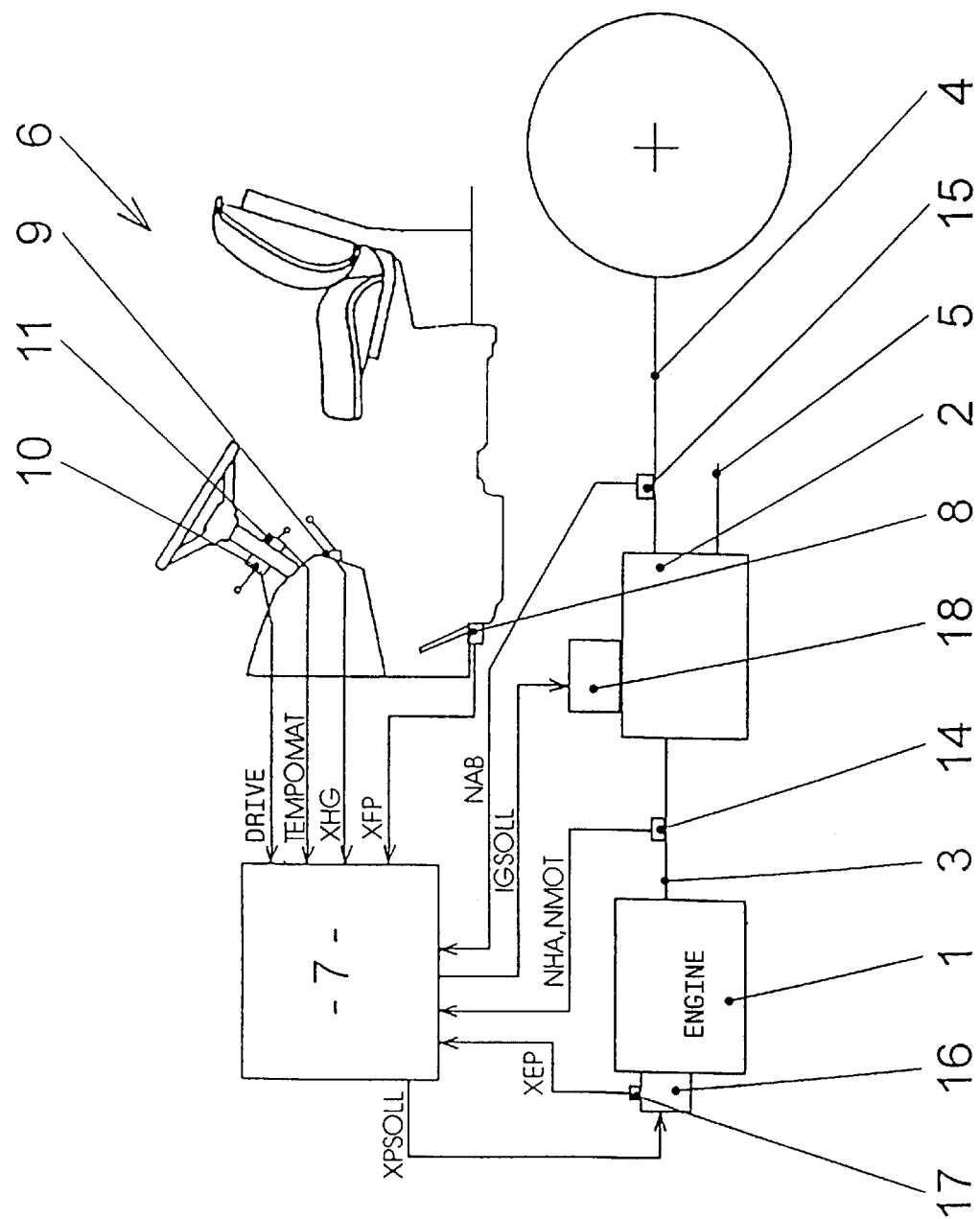
FIG. 1: shows a schematic diagram of a vehicle drive unit which is controlled in accordance with the method according to the invention.

FIG. 1 only indicates the engine 1 of a vehicle drive unit, an internal combustion engine. This drives an output drive shaft 4, via a transmission input shaft 3 and a continuously variable transmission 2, for the drive wheels (which are only indicated) of the vehicle, and possibly for a power takeoff shaft 5 as well. The controller 7, a computer with a stored program, may be arranged at any desired point, the following control elements, which are used to produce command signals for the controller, are located at the driver's location 6 in the vehicle;

- a position signal XFP from a throttle control pedal 8
- a position signal XHG from a manual throttle control lever 9, both corresponding to a predetermined load or speed,
- a selection signal ("DRIVE", "REVERSE", "INCH", "NEUTRAL") from a selection lever 10
- a Tempomat signal ("ON", "OFF", "LB", "LV", "MEMORY") from a Tempomat lever 11 possibly other signals as well, such as a brake signal.

The state sensors which produce state signals and supply them to the controller 7 are also fitted in the vehicle drive unit:

- a rotation speed sensor 14 for the input rotation speed NHA (pulse transmitter),
- a rotation speed sensor 15 for the output drive rotation speed signal NAB (output drive shaft 4), which is a double sensor in order to allow the rotation direction to be detected,
- a position sensor 17 for the control rod position XEP of the drive engine at the actuating element 16 of the drive engine, in the case of a diesel engine, in general the position of the element which determines the power.

The controller uses the command signals and the state signals to calculate a control signal XEPSOLL for the internal-combustion engine, and a control signal IGDSOLL for the controller 18 for the continuously variable transmission. The manner in which the controller 18 converts the control signal for the required transmission gear ratio (IGDSOLL) depends on the design of the continuously variable transmission.

Figure 2:
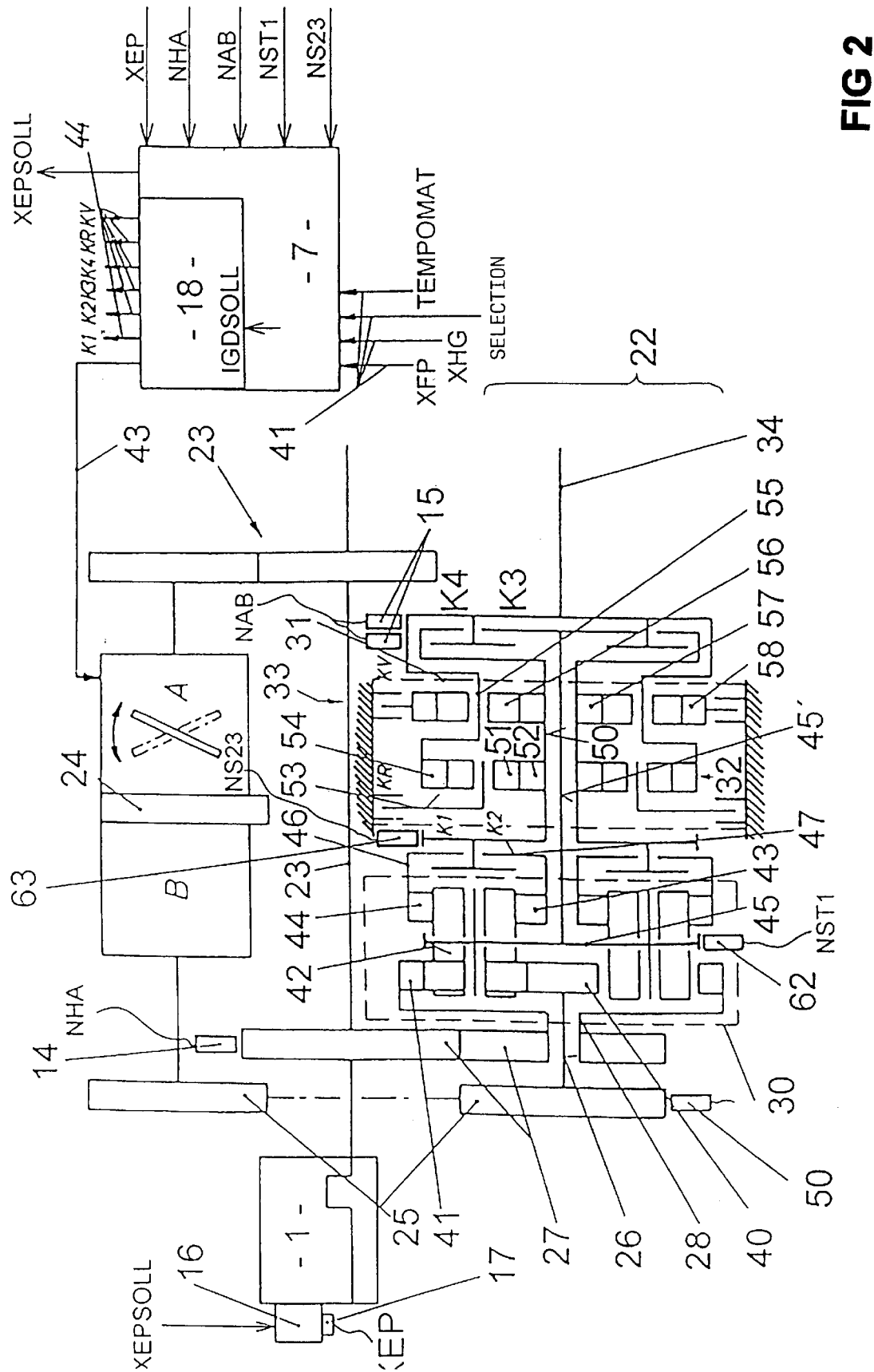
FIG. 2: shows a schematic diagram of a specific transmission system which is suitable for the method according to the invention.
Figure 3A:
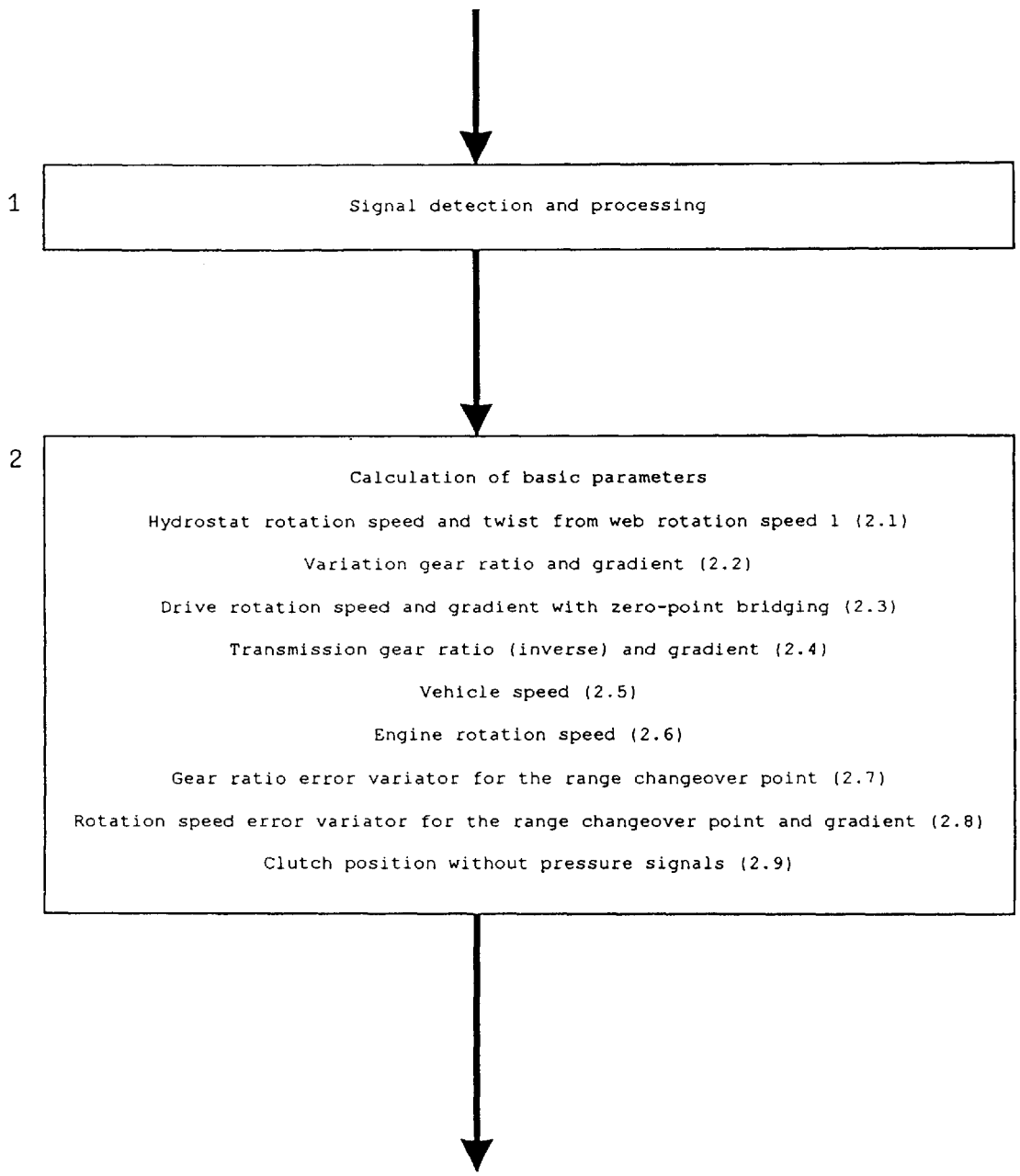
FIG. 3: shows a flowchart of the method according to the invention, in Tables A to D.
in FIG. 3B, FIGS. 7, 8: show diagrams relating to field 3.2.1.
in FIG. 3D, FIG. 14: shows a diagram relating to field 5.3.
Figure 3B:
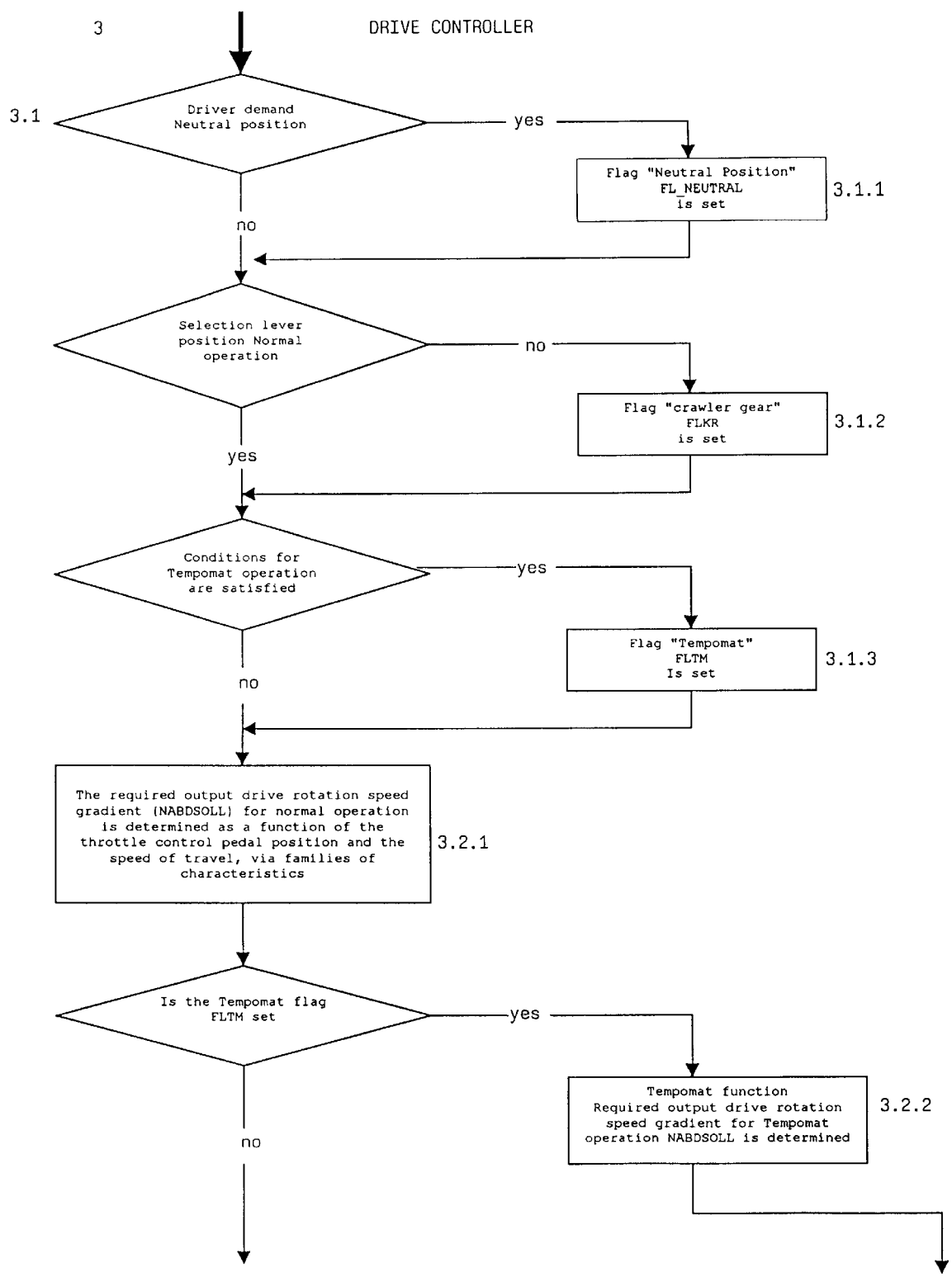
Figure 3C:
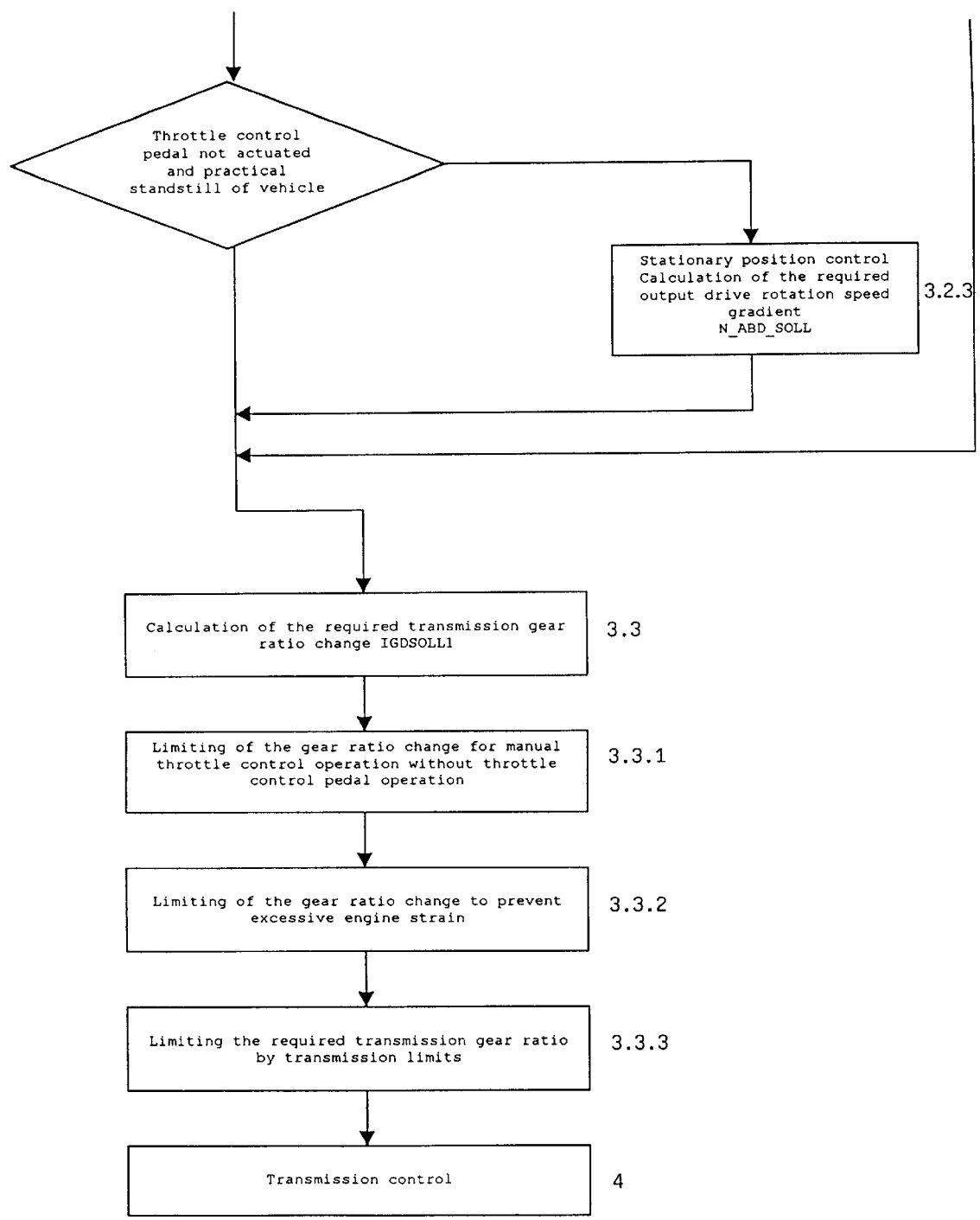
Figure 3D:
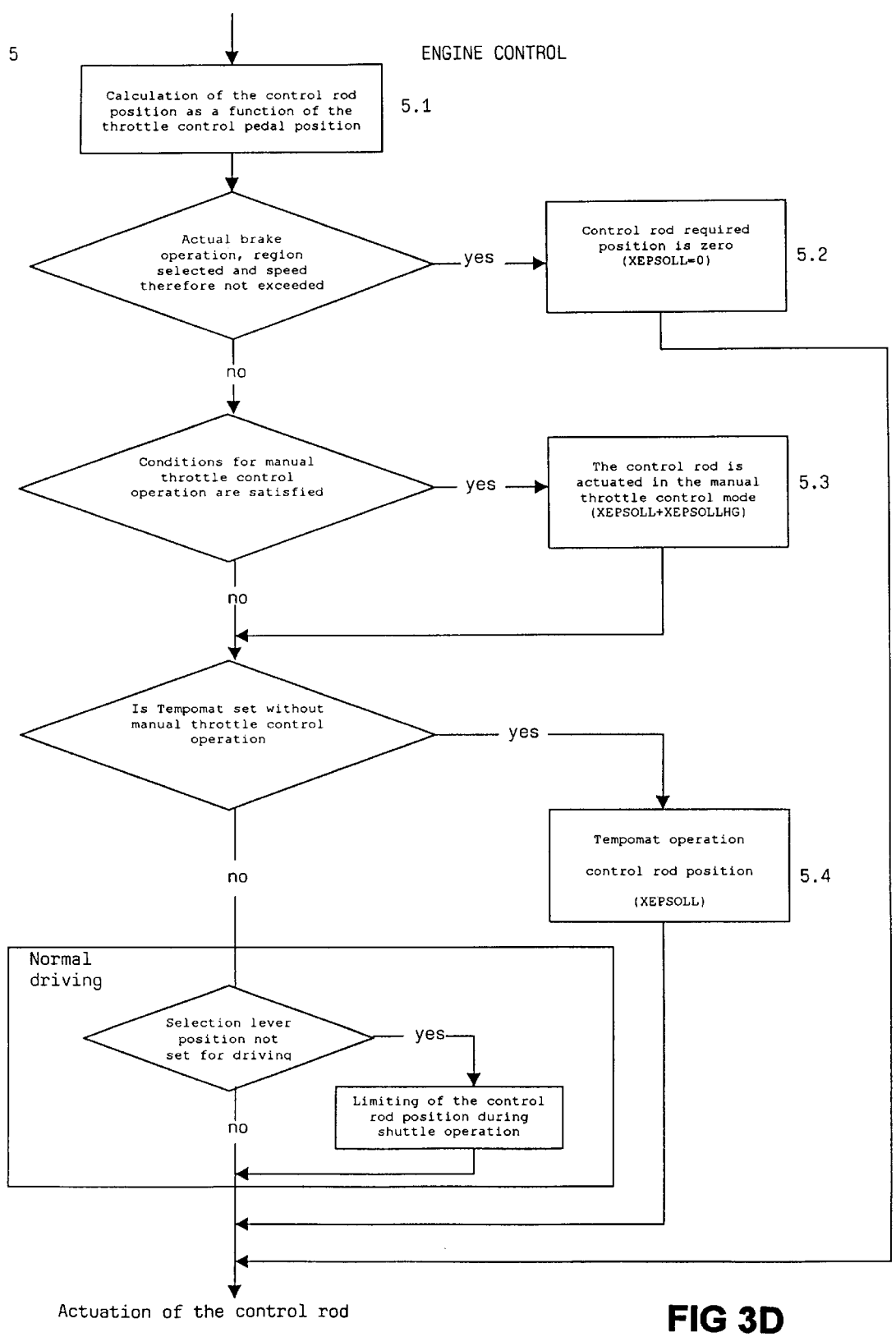
Figure 4A:
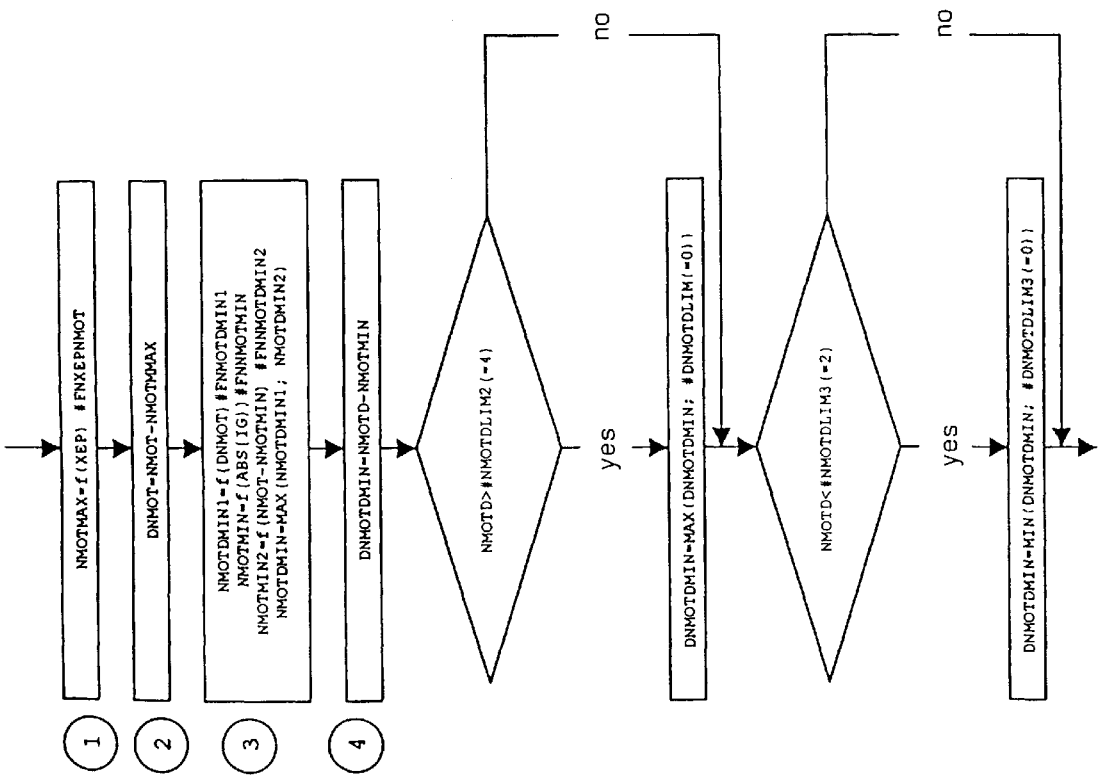
FIG. 4: shows a flowchart, detail 3.3.2. relating to FIG. 3C, FIGS. 5, 6: show diagrams relating to the field 3.2.1.
Figure 4B:
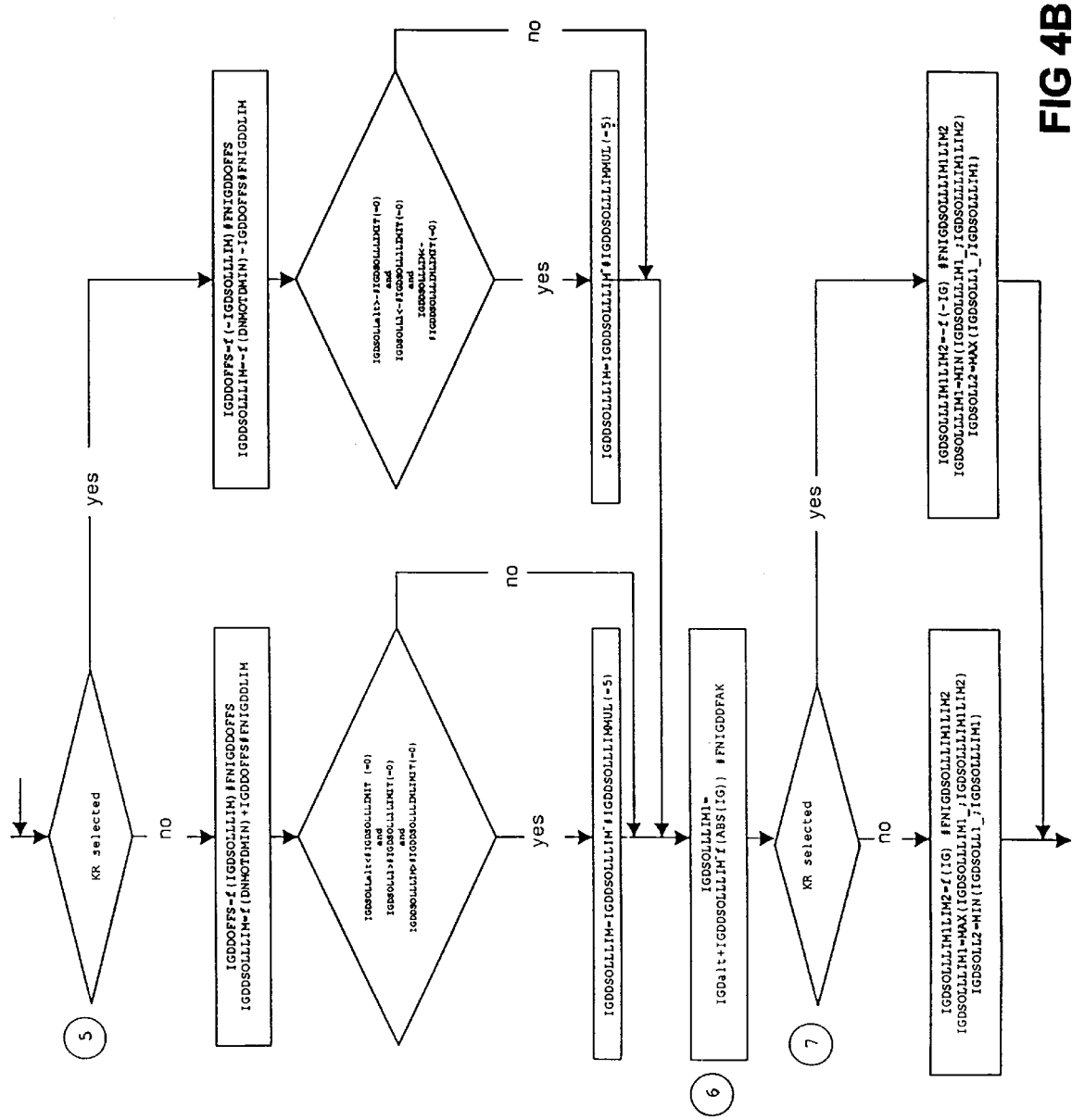

By way of example, FIG. 2 shows a continuously variable transmission that is suitable for the method. This is a hydrostatic-mechanical power splitting transmission 22. The internal combustion engine 1 in this case on the one hand drives a controllable hydrostat unit 24 via a first gearwheel transmission 23, the output from which hydrostat unit 24 drives a first input shaft 26 via a second gearwheel transmission 25. On the other hand, the transmission input shaft 23 drives a second input shaft 28 via a third gear-wheel transmission 27. The hydrostat unit 24 (also called a variator in the following text) comprises two hydrostatic machines A, B, one of which always operates as a motor, and one as a pump. The rotation speed of the machine B can be controlled by infinitely variable control of the machine A in both rotation directions.

The two input shafts 26, 28 are part of a summing epicyclic transmission 30, from which a variable-speed transmission 31 is driven via clutches K1, K2, and which in this case comprises a first epicyclic transmission stage 32 having a clutch KR, and a second epicyclic transmission stage 33 having a clutch KV. An output drive shaft 34, which is used to drive a vehicle, is connected via clutches K3, K4 in the third and fourth gears.

The summing epicyclic transmission 30 includes a first sunwheel 40, a first annular gear 41 and stepped planet gears 42, which form the first planet set. The second planet set comprises a second sunwheel 43, an annular gear 44 and the stepped planet gears 42, which are common to both sets. The planet gears 42 are mounted in a planet gear carrier 45, whose shaft is the first output shaft 45' of the summing epicyclic transmission 30. The second annular gear 44 acts on the clutch K1 via an annular gear shaft 46, which is the second output shaft. The second sunwheel 43 acts via a sunwheel shaft 47 on the clutch K2, and is the third output shaft of the summing epicyclic transmission 30.

The first stage 32 of the variable-speed transmission comprises a first sunwheel 51, first planet gears 52, a first planet gear carrier 53 and a first annular gear 54. The sunwheel shaft 50 is selectively driven by one of the two clutches K1, K2, and the first planet gear carrier 53 can be held at rest by means of the clutch KR on the stationary housing. The first annular gear 54 is connected to a second planet gear carrier 55 of the second planet transmission stage 53 such that they rotate together. Its planet gears 56 engage internally with a second sunwheel 57, which is connected to the sunwheel shaft 50 such that they rotate together, and is connected on the outside to a second annular gear 58, which can be held stationary via the clutch KV on the housing. The output drive shaft 34 is connected to the second planet gear carrier 55 such that they rotate together and can be connected via the clutches K3, K4 either to the planet gear carrier shaft 45 or to the sunwheel shaft 50, such that they rotate together.

Furthermore, the rotation speed sensors 14, 15 are provided for the input rotation speed NHA and the output drive rotation speed NAB, as well as two further rotation speed sensors 62, 63 are provided for the rotation speed NST1 of the planet gear carrier 45 of the summing epicyclic transmission (web rotation speed) 30 and for the rotation speed NS23 of the sunwheel shaft 50 of the variable-speed transmission. All these rotation speed signals are once again supplied to the controller 7.

The described transmission is only an exemplary embodiment. This may be a transmission which is infinitely variable or is continuously variable, as required. In particular, in the case of the hydrostatic-mechanical power splitting transmission, the arrangement and design of the variator, the summing transmission, the clutches and variable-speed transmissions may be modified within wide limits.

FIG. 3 summarizes the method steps in blocks, whose designation corresponds with the numbering of the following sections, in which the individual steps are described—to the extent that is significant to the method according to the invention. The definition of the symbols can be found in the attachment to the description, with the designation of suitable selected functions and families of characteristics being preceded by a #.

1. Signal Detection and Processing

The input parameters required for the controller are calculated in physical units from the digital and analog input signals, in the software modules for signal detection and processing. Signal filtering, the calculation of signal gradients and gradient limiting are also carried out here, to the necessary extent. The logic functions used for signal detection correspond to the prior art, and are thus not described completely in the following text.

2. Calculation of the Basic Parameters 2.1. Hydrostat Rotation Speed and Twist From Web Rotation Fpeed NST1

Hydrostat rotation speed NHYDST1:

NHYDST1=(NST1-#NST1OFFSET*NHA)*#KST1

2.2. Variator Gear Ratio IV and its Gradient IVD

The variator gear ratio IV is calculated as the ratio of the hydrostat rotation speed NHYDST1 and the input rotation speed NHA

IV=NHYDST1/NHA

2.3. Output Drive Rotation Speed NAB and Gradient With Zero-Point Bridging

At output drive rotation speeds NAB close to the measurable minimum rotation speed and with the slowest range (V1 or R1) selected, the output drive rotation speed NAB1 is calculated from the web rotation speed NST1 and the annular gear rotation speed NHA, in order to obtain a continuous signal profile down to NAB equal 0, as is required, for example, for stationary position control.

If ABS(NAB) is less than #NABMIN1 and K1 is closed (range V1 or R1), with KVIGA, KVIGB, KRIGA and KRIGB being calculated in an appropriate manner from the numbers of teeth in the transmission, then
if KV is closed (range V1):

$$NAB1 = \#KVIGA*NST1 + \#KVIGB*NBA$$

if KR is closed (range VR):

$$NAB1 = \#KRIGA*NST1 + \#KRIGB*NHA$$

if neither KV nor KR is closed:

$$NAB1 = NAB$$

2.4. Transmission Gear Ratio IG and Gradient IGD

The transmission gear ratio IG is in general formed as the ratio of the output drive rotation speed NAB1 and the input rotation speed NHA. It is thus an inverse, in order to obtain a continuous profile down to zero when a transmission gear is selected.

$$IG = NAB1/NHA$$

2.5. Vehicle Speed $$VFZ = NAB1/\#IHAV (km/h) \; \#IHAV = \frac{30*1000}{R_h * Pi * 3.6 * iHA}$$

where #IHAV is the ratio, dependent on geometric parameters, between the output drive rotation speed and the speed of travel.

2.6. Engine Rotation Speed $$NMOT = NHA * 39/49 \quad N_{MOT} = N_{HA} * \frac{z2}{z1}$$

2.7. Gear Ratio Discrepancy of the Variator at the Range Changeover Point

This gear ratio discrepancy is used in the transmission according to FIG. 1 as the criterion for switching the clutch K3.
If IV is greater than or equal to 0:

$$DIVSYN = 1 - IV$$

If IV is less than or equal to 0:
  If IG is less than 0.5:

$$DIVSYN = 1.023256 - IV$$

If IG is greater than or equal to 0.5:

$$DIVSYN = 1.021600 - IV$$

2.8. Rotation Speed Discrepancy of the Variator for the Range Changeover Point and Gradient This rotation speed discrepancy is used in the transmission shown in FIG. 1 for range switching as the criterion for switching the clutch for the new range.

$$DNSYN = ABS(DIVSYN)*NHA$$

$$DNSYND = DNSYN - DNSYNold, \text{ filtered with } \#FCDNSYND$$

2.9. Clutch Position XK Without Pressure Signals

If the intention is to manage without a clutch pressure sensor, the clutch position KUST is identified on the basis of the clutch actuation KUSTSOLL and the calculated twist DNIKx at the individual clutches x.
Calculation of the Clutch Position KUSTOD
If the Kx bit in KUSTSOLL is set:

$$XKx = XKxold + \#VKXEIN$$

If XKx is greater than or equal to #XKXMAX:

$$XKx = \#XKXMAX$$

If ABS(DNIKx) is less than #DNIKxLIM1:

Kx bit in KUSTOD
If the Kx bit in KUSTSOLL is deleted:

$$XKx = XKxold - \#VKXAUS$$

If XKx is less than or equal to 0:

$$XKx = 0$$

If ABS(DNIKX) is greater than #DNIKxLIM2:

delete the Kx bit in KUSTOD

3. Driving Control Module

The driving control module uses the driver's demand (position of the manual throttle control and/or of the throttle control pedal and/or of the selection lever) to calculate the corresponding transmission gear ratio change as an input variable IGDSOLL for the transmission control module. In order to ensure continuous operation of the transmission variation after the selection of a transmission range, the driving control module is initialized with that gear ratio change which corresponds to the current motion state of the (freewheeling) vehicle.

3.1. Driver's Demand Identification

3.1.1. Driver's Demand "Neutral Position"

When the neutral switch is operated (during a specific time TNEUTRAL in program cycles), the FLNEUTRAL flag is set in the following conditions, which causes the appropriate clutch to be disengaged in the transmission control module (3.2, see there).
If (TNEUTRAL is greater than #TNEUTRAL and
  Abs(NAB1) is greater than #NAB1NEUTRAL) or
  TNEUTRAL is greater than #TNEUTRAL2:
    FLNEUTRAL flag is set
If this condition is not satisfied:
    FLNEUTRAL flag is deleted

3.1.2. Driver's Demand "Crawl"

The crawling function is controlled via the FLKR flag when the selection lever is moved to "CRAWL".
When the selection lever position is "normal operation":
  If FLKR is set and XFP is less than #XFPKRLIM:

FLKR=0

If the selection lever position is "crawling drive":

FLKR=1

Checking the throttle control pedal position is intended to avoid the vehicle accelerating unexpectedly if the selection lever is accidentally moved to normal drive while crawling.

3.1.3. Driver's Demand "Tempomat"

The Tempomat function is controlled via the FLTM flag by operating the Tempomat switch for a specific time period (t).

If the Tempomat switch is set to "OFF" or the brakes are operated for t greater than #TTM2LIM:

FLTM=0

If the Tempomat switch is set to "ON", "LV", "LB" or "MEMORY" for t greater than #TTM1LIM:

FLTM=1

If FLTM=1 and
(Selection lever position "reverse" and VSOLLTM greater than 0) or
(Selection lever position "drive" and VSOLLTM less than 0)):

FLTM=0

3.2. Calculation of Required Vehicle Acceleration and Required Output Drive Rotation Speed Gradient

3.2.1. Normal Driving

During normal driving, the driver's demand is conveyed via the throttle control pedal 8. The required vehicle acceleration ASOLL is calculated as a function of the throttle control pedal position XFP and the speed of travel VFZ by linear interpolation from stored families of characteristics #ASOLLx (see FIGS. 5, 6, 7 or 8). The function values from the families of characteristics are in this case assigned to the input parameters by means of support point functions #FTx. One of the four different families of characteristics (FIGS. 5, 6, 7 or 8) is accessed depending on the selection lever position ("DRIVE" or "REVERSE") and, possibly, the driver's demand crawl (FLKR):

ASOLL=f(XFPFR, VFZ)

```
If FLKR is not set:
    If the selection lever is set to "drive":
    Family of characteristics      #ASOLLF see FIG. 5
    If the selection lever is set to "reverse":
    Family of characteristics      #ASOLLR see FIG. 6
If FLKR is set:
    If the selection lever is set to "drive":
    Family of characteristics      #ASOLLFKR see FIG. 7
    If the selection lever is set to "reverse":
    Family of characteristics      #ASOLLRKR see FIG. 8
```

The required output drive rotation speed gradient NABDSOLL for normal operation is obtained from the respective required acceleration ASOLL:

NABDSOLL=ASOLL/#NABDKONST

NABDKONST is a suitably selected constant, which expresses the ratio between the current rotation speed gradient and the vehicle acceleration.

3.2.2. Tempomat Function

If the Tempomat flag FLTM has not yet been set, then the required Tempomat speed VSOLLTM is initialized continuously to the current speed of travel VFZ, and a jump is made to 3.2.3:

If FLTM is not set:

VSOLLTM=VFZ

If the Tempomat flag FLTM has been set, a stationary position control process which is set on a case-by-case basis is deleted, and the required vehicle speed VSOLLTM and required vehicle acceleration ASOLLTM are calculated in accordance with the following functions:

If FLTM is set:

FLST=0(delete stationary position control process 3.2.3)

Variable required acceleration for LV/LB:

ASOLLLB=f(VFZ)

FNASOLLLB

If the LV button is operated (slow deceleration):

VSOLLTM=VFZ

If KR is selected (reversing):

ASOLLTM=ASOLLLB

If KV is selected (drive):

ASOLLTM=−ASOLLLB

If the LB button is operated (slow acceleration):

VSOLLTM=VFZ

If KR is selected (reversing):

ASOLLTM=−ASOLLLB

If KV is selected (drive):

ASOLLTM=ASOLLLB

If the LV button and the LB have not been operated:
    If the Tempomat "MEMORY" has been operated:

VSOLLTM=VSOLLTMMEM

If the Tempomat switch is "ON" for t greater than #TTM1LIM:

VSOLLTM=VFZ

In these cases, the required acceleration is calculated as a function of the speed error:

ASOLLTM=f(VSOLLTM−VFZ)

FNASOLLTM, in a specific range (±10 km/h) linear function (e.g.)
Updating of the Tempomat memo value:

VSOLLTMMEM=VSOLLTM

3.2.3. Stationary Position Control Process

The aim of the stationary position control process is to maintain the vehicle in a stationary position, once this has been reached, with the slowest transmission range V1 or R1 being selected and without operating the throttle control pedal. The stationary position control process starts when the throttle control pedal is not operated and the vehicle is virtually stationary:

If FLST=0 and
if XFPFR is less than or equal to #XFPLIM and
if (Abs(NAB1) is less than or equal to #NAB1LIM or
    Sign(NAB1) is not equal to Sign(NAB1old):

FLST=1 and

NABI=0

(Initialization of the position calculation and thus definition of the required position, see further below)

The stationary position control process is left when the throttle control pedal is operated:
If XFPFR is greater than #XFPLIM1:

FLST=0

If the stationary flag FLST is set, then the following functions are carried out in order to calculate the required output drive rotation speed gradient:
Calculation of the Error From the Required Position The error from the required position 0 is calculated by integration of the output drive rotation speed. The integral is limited to a value corresponding to a movement distance of about 10 cm. In consequence, the required position should not differ from the vehicle's actual position by more than this value ("forgetting" the original required position), and this avoids the vehicle returning to the original required position after an accidental major error from that original required position (e.g. overloading of the variator).
If FLST=1:

NABI=NABIold+NAB1, the magnitude of which is limited by #NABILIM
Calculation of the Required Output Drive Rotation Speed Gradient The output drive rotation speed gradient is calculated as a function of the position error and the output drive rotation speed itself (controller function):

NABDSOLL=$f_1$(NAB1)+$f_2$(NAB1)

$f_1$=#FNNABDSOLL and $f_2$=#FNNABDSOLL1 are suitably selected functions.
On reaching an output drive rotation speed corresponding to about 1 cm/s, the output drive rotation speed gradient is limited, in order to avoid controller oscillation.
If (NAB1 is greater than #NAB1STR and NABDSOLL is greater than 0) or
If (NAB1 is less than−#NAB1STR and NABDSOLL is less than 0):

NABDSOLL=0

3.3. Calculation of the Required Transmission Gear Ratio Change

A first required transmission gear ratio change corresponding to the required output drive rotation speed gradient is calculated taking account of the input rotation speed. Although the algorithm could take account of the input rotation speed gradient NHAD, as required per se, this has been found to be problematic, however, since oscillations may possibly be stimulated; consideration of this gradient may be partially or entirely switched off. Furthermore, the input rotation speed NHA for this calculation is limited to a minimum level of 1000 rpm in order to avoid excessively great transmission variations at a low engine rotation speed.

IGDSOLL1=(NABDSOLL−NHAD*IG)/NHA

In order to take account of different operating states and system limits, the gear ratio change IGDSOLL1 is subjected to various limitations in the following text.
3.3.1. Gear Ratio Change With Manual Throttle Control Operation or Throttle Control Pedal Operation When manual throttle control operation is being used or at an engine rotation speed close to idle and with a throttle control pedal position of virtually zero, this forces the transmission to a minimum change-down speed in order to allow the vehicle to be decelerated without operating the brakes. This logic represents a simplified solution, and could also be replaced by separate acceleration families of characteristics for manual throttle control operation.
If FLTM is not set and
if (FLHG=1 or NMOT is less than 850) and
if XFP is less than #XFPHGLIM:
If IG is greater than +0.1 (drive):

IGDSOLL1=MIN (IGDSOLL1; #IGDMAXHG)

If IG is less than −0.1 (reverse):

IGDSOLL1=MAX (IGDSOLL1; −#IGDMAXHG)

3.3.2. Limiting the Engine Strain

Engine strain means a reduction in the rotation speed of the engine while the load is rising. In the case of a diesel engine with a RQV controller, the engine's own controller reacts to this by increasing the injection flow rate. As is shown in more detail in FIG. 3, this functional module is formed from the following functional submodules:
3.3.2.1. Calculation of the Optimum Engine Operating Point (Required Rotation Speed)

The desired engine operating point (engine rotation speed) is calculated as a function of the control rod position.

Figure 9:
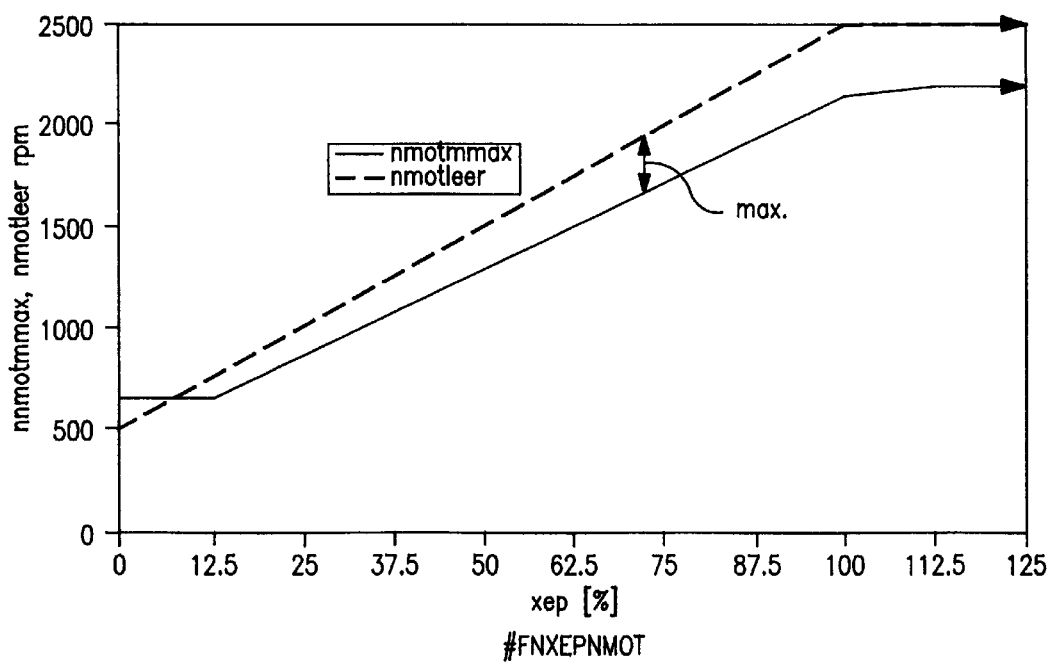
FIG. 9: shows a diagram relating to field 3.3.2.

NMOTMMAX=f(XEP)

f=#FNXEPNMOT see FIG. 9:

The function values are intended to correspond roughly to the operating points where the injection flow rate is at a maximum; lower rotation speeds reduce the available engine power, while higher rotation speeds also increase the fuel consumption. However, slightly increased values are advantageous for full power output or power takeoff shaft operation (see the engine family of characteristics). This could be taken into account by using different families of characteristics depending on the operating mode (for example ECO, POWER, PTO, switchable by means of an additional control element or depending on the operating mode).
3.3.2.2. Calculation of the Rotation Speed Error (Control Error)

The primary control aim of the strain control module is to prevent the engine rotation speed falling below the optimum. The control error is therefore defined as the difference between the engine rotation speed and the optimum point. Error between the engine rotation speed and the optimum point:

DNMOT=NMOT−NMOTMMAX 3.3.2.3. Calculation of the Required Engine Rotation Speed Gradient to Achieve the Required Rotation Speed A required engine rotation speed gradient (corresponding to the transmission input rotation speed gradient) is calculated from the engine rotation speed control error DNMOT and is intended to be used to change the engine rotation speed to the optimum point. This required gradient is a secondary control aim of the strain control module, with the advantage that the control characteristic can be matched directly with respect to the subjective vehicle feel. Particularly in the case of kick down downward gear change or a downward gear change owing to a suddenly increased resistance to motion (for example a change from a flat road to a grade), it is essential that the rotation speed gradient be monitored in order to avoid, for example, interruptions in the tractive effort (limitation of the power used for engine acceleration).

Figure 10:
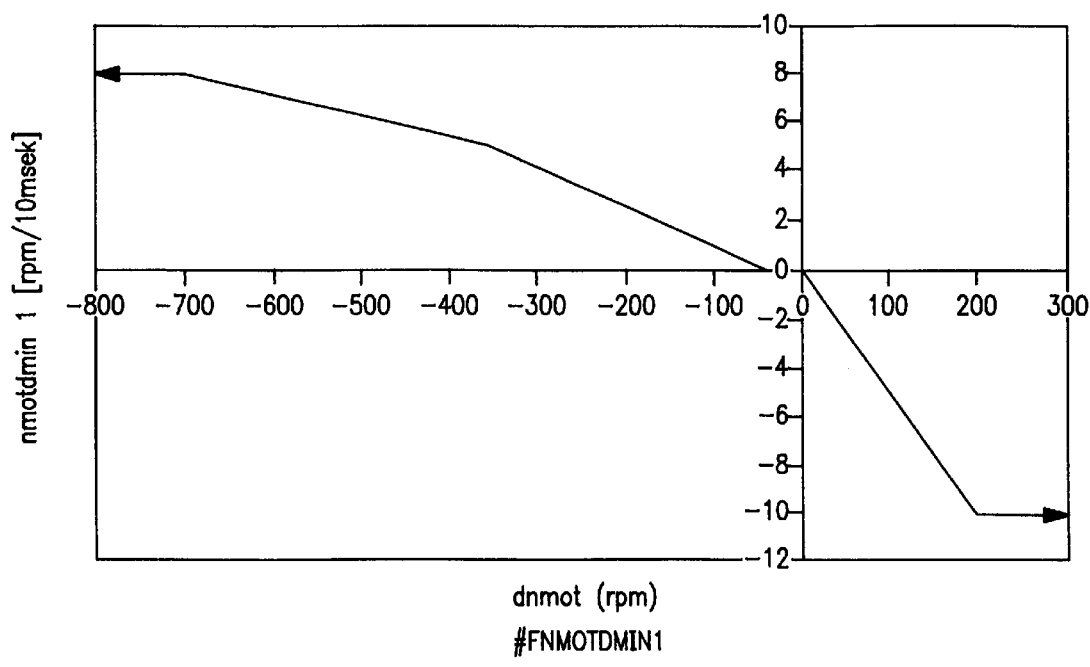

Minimum required engine rotation speed gradient which the controller is intended to maintain:

NMOTDMIN1=f(DNMOT)

f=#FNNMOTDMIN1 see FIG. 10

The function values must be matched to the engine characteristic (torque, moment of inertia) and what the customer wants. In an analogous manner to the above steps 1–3, a second required engine rotation speed gradient is determined, which is intended to prevent engine stalling and the minimum engine rotation speed from being undershot in the higher transmission gear ratios. A specific control characteristic (if required, faster transmission downward gear change) can thus be provided in order to maintain this minimum rotation speed.

Minimum Engine Rotation Speed

Figure 11:
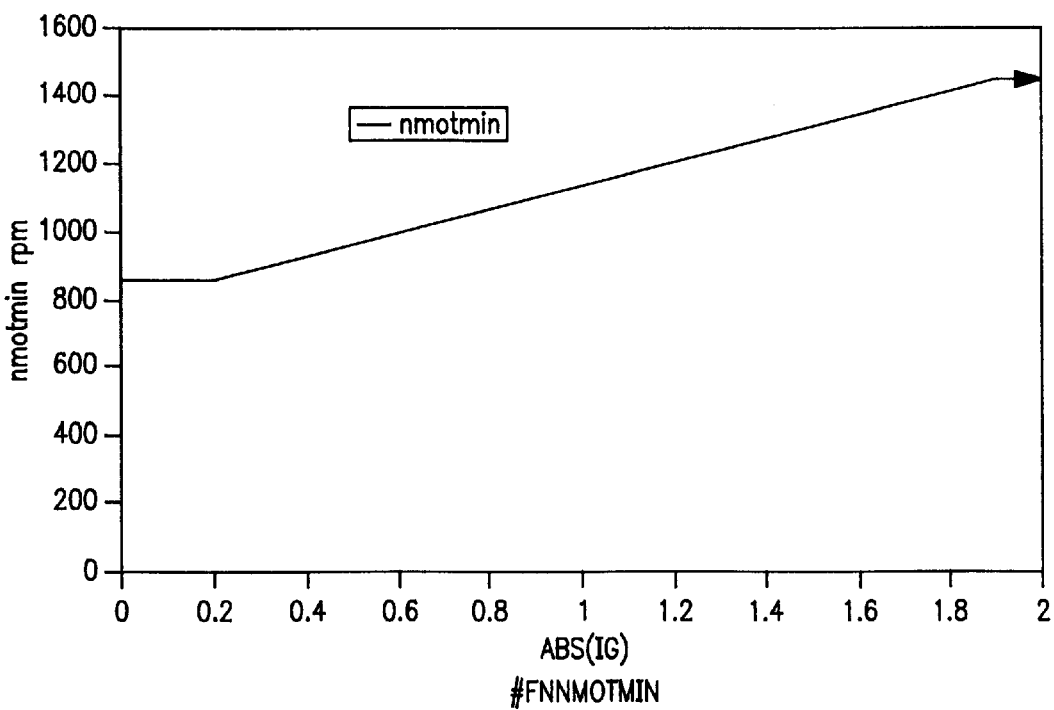
Figure 12:
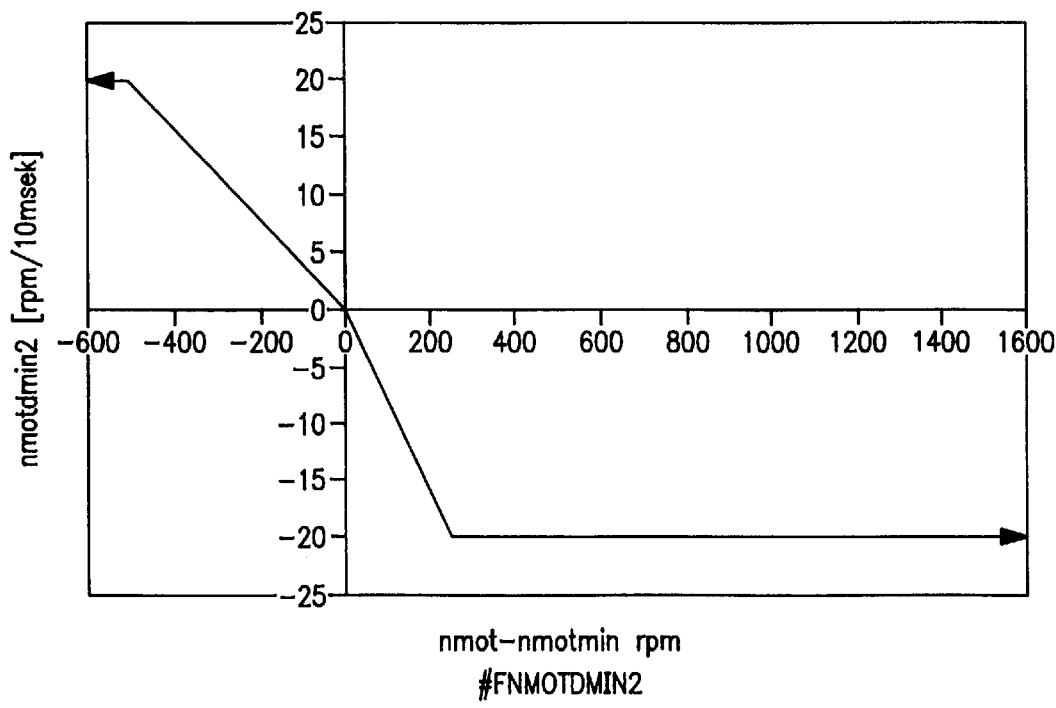

This is predetermined as a function of the vehicle speed VFZ or the transmission gear ratio IG. In the latter case:

NMOTMIN=f(ABS(IG))

f=#FNNMOTMIN see FIG. 11

This is used to calculate the required engine rotation speed gradient to maintain the minimum rotation speed, as a function of the rotation speed error:

NMOTDMIN2=f(NMOT−NMOTMIN)

f=#FNNMOTDMIN2
see FIG. 11

Resultant Required Engine Rotation Speed Gradient

Calculated as the maximum of the required gradient to maintain the optimum operating point and the minimum rotation speed. By controlling this required gradient, it is thus possible to achieve both control aims from now on.

NMOTDMIN=MAX(NMOTDMIN1; NMOTDMIN2)

3.3.2.4. Calculation of the Engine Rotation Speed Gradient Error

The secondary control aim of the strain controller is to prevent the required input rotation speed gradient from being undershot. The gradient control error is therefore defined as the difference between the engine rotation speed gradient and the required value NMOTDMIN.

DNMOTDMIN=NMOTD−NMOTDMIN

In order to prevent control oscillations in dynamic operating states (high engine rotation speed gradients), this control error is subject to the following limitations:

During engine acceleration with a gradient of more than #NMOTDLIM2=4 rpm/computation cycle (corresponding to 318.5 rpm/s, selected adjustment factor), the control error is subject to a downward limit of 0. In consequence, the reduction for the transmission variation is limited from then on and, in particular, excessive downward gear changes on kick down (kick-down hole) are avoided.

If NMOTD is greater than #NMOTDLIM2 (=4, engine running at a sufficiently high speed):

DNMOTDMIN=MAX(DNMOTDMIN; #DNMOTDLIM=0)

In the same way, if the rotation speed strain on the engine is too fast (rotation speed drop, for example greater than 160 rpm/s), the control error is limited to 0 upward, in order to prevent the transmission from changing up too fast.

If NMOTD is less than #NMOTDLIM3 (=−2, engine being decelerated too fast):

DNMOTDMIN=MIN(DNMOTDMIN; #DNMOTDLIM3=0)

3.3.2.5. Calculation of the Limit Value for the Derivative of the Required Transmission Variation Limiting the transmission variation in accordance with the driver's demand is intended to avoid the above gradient control error becoming negative (that is to say the engine rotation speed gradient in accordance with 3.3.3.3. becoming less than is necessary to achieve and maintain the required rotation speed in accordance with 3.3.3.1.).

Direct limiting of the transmission gear ratio change as a function of the control error does not achieve the object in this case since this allows only the vehicle acceleration to be influenced. However, the acceleration change (the jerk) plays by far the greater role in the subjective vehicle feel. A limit value for the derivative of the required transmission variation is therefore preset, as a function of the control error (#FNIGDDLIM).

In this case, the function value also has an offset value added to it, which is calculated as a function of the gear ratio change currently selected by the transmission control module (#FNIGDDOFFS). The offset value causes the transmission gear ratio change to converge to 0 in a manner which can be controlled via the function values. This is necessary for stabilization of the control process since any gear ratio change produces a load change of the engine, and a stable operating point is thus feasible only if the magnitude of the gear ratio change is reducing.

Limiting of the derivative of the required transmission variation can result in delays in the response of the vehicle to an acceleration demand if this is preceded by a deceleration demand (negative IGD_SOLL1). In order to reduce this deceleration, the above derivative is increased by the multiplication factor #IGDDSOLLLIMMUL (=5) when the transmission is changing down (IGDSOLLold less than 0), but the driver's demand and the engine strain allow changing up (IGDSOLL1 greater than 0 and the above 2nd derivative greater than 0). This speeds up the transition from changing down to changing up. The above statements relate to driving, changing up and changing down should be interchanged in the meanings for reversing.

Permissible Gradient for Gear Ratio Variation (2nd Derivative IG)

Figure 5:
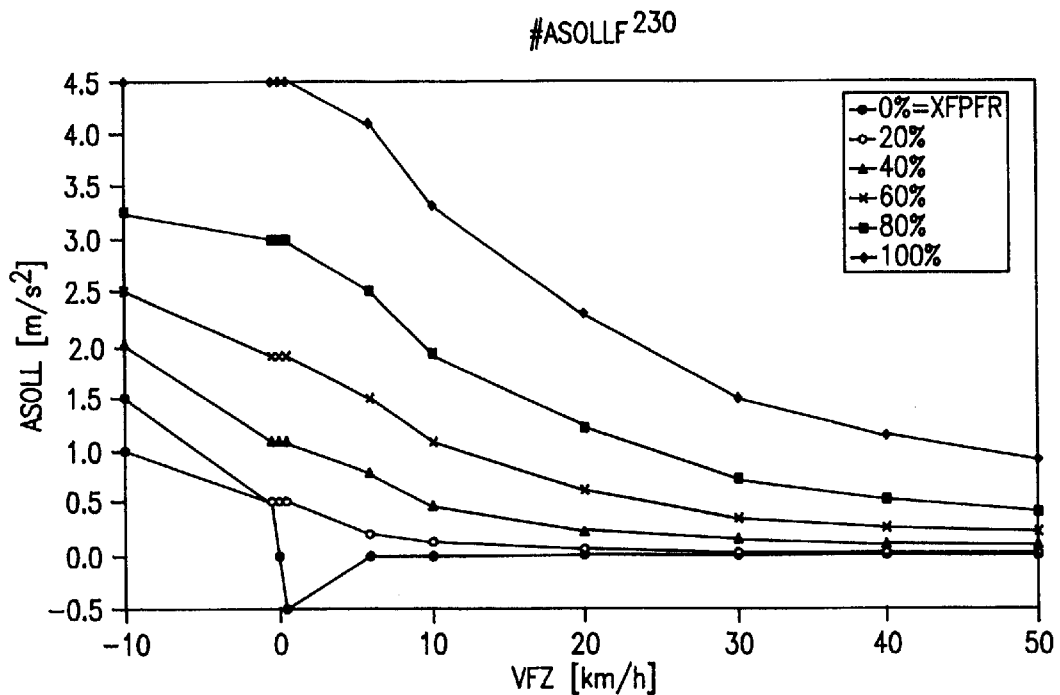
Figure 6:
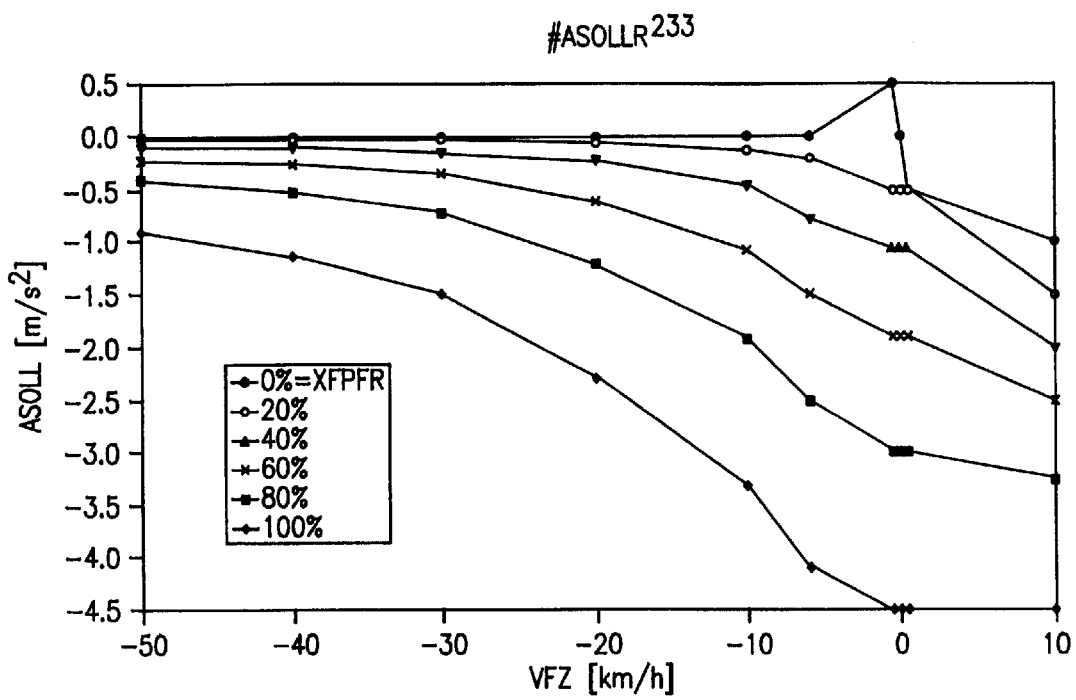
Figure 7:
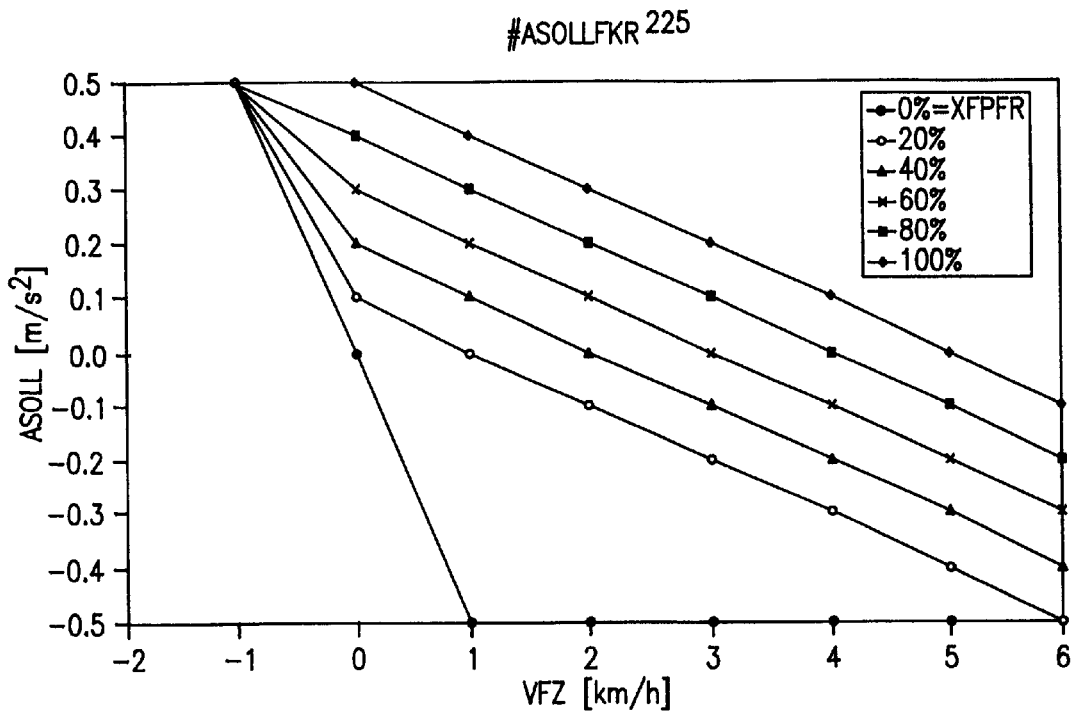
Figure 8:
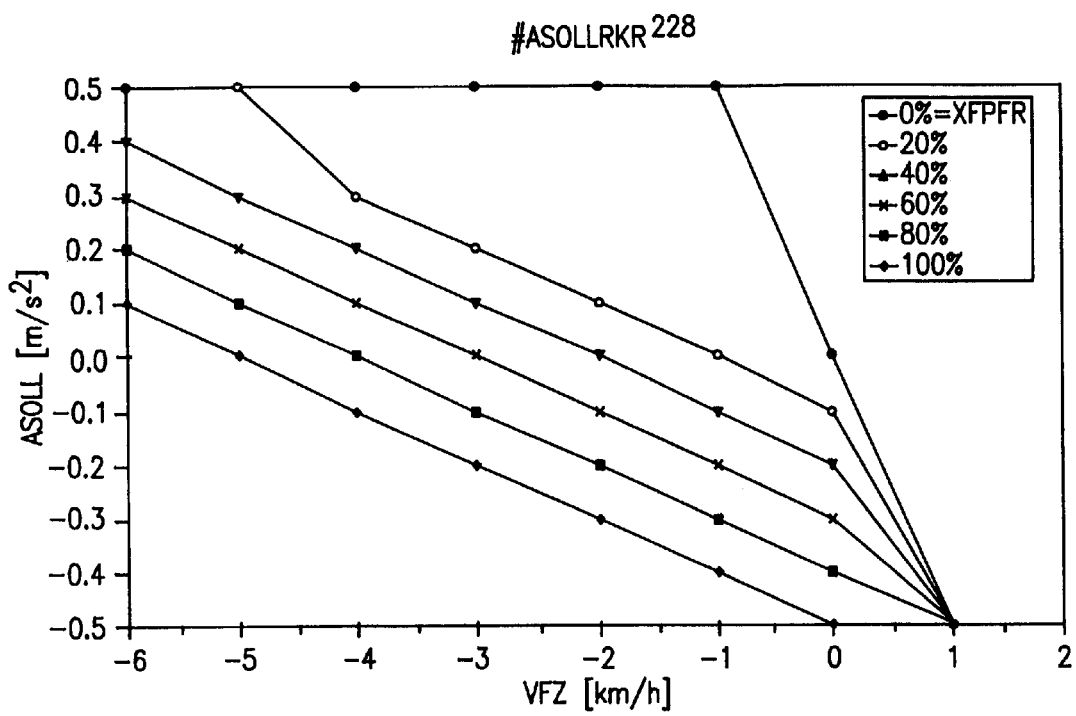

If KR is not selected (drive):

IGDDOFFS=f(IGDSOLLLIM)

f=#FNIGDDOFFS (FIG. 5)

IGDDSOLLLIM=f(DNHADMIN)+IGDDOFFS f=#FNIGDDLIM (FIG. 6)
If IGDSOLLold is less than #IGDSOLLLIMIT(=0) and
if IGDSOLL1 is greater than #IGDSOLL1LIMIT (=0) and
if IGDDSOLLLIM is greater than #IGDDSOLLLIMLIMIT (=0):

IGDDSOLLLIM=IGDDSOLLLIM*#IGDDSOLLLIMMUL (=5)

If KR has been selected (reversing):

$$IGDDOFFS=f(-IGDSOLLLIM)$$

f=#FNIGDDOFFS (FIG. 5)

$$IGDDSOLLLIM=-f(DNHADMIN)-IGDDOFFS$$

FNIGDDLIM (FIG. 6)
If IGDSOLLold is greater than −#IGDSOLLLIMIT (=0) and
if IGDSOLL1 is less than −#IGDSOLL1LIMIT (=0) and
if GDDSOLLLIM is less than −#IGDDSOLLLIMLIMIT (=0):

$$IGDDSOLLLIM=IGDDSOLLLIM*\#IGDDSOLLLIMMUL\;(=5)$$

3.3.2.6. Calculation of the Limit Value for the Transmission Variation

To calculate the limit value for the gear ratio change, the derivative of the transmission variation is added to the required gear ratio change from the previous program cycle (gradient integration). In this case, the derivative is also subjected to weighting as a function of current transmission gear ratio, in order to achieve matching to the control rate (gear ratio changes have a greater effect on the engine load at a high transmission gear ratio than at a low ratio).

$$IGDSOLLLIM1=IGDSOLLold+IGDDSOL\_LIM*f(ABS(IG))$$

f=#FNIGDDFAK 3.3.2.7. Limiting the Transmission Variation

In order to limit IGDSOLLLIM1 as well, it is possible for the limit on the transmission variation IGDSOLL1 corresponding to the driver's demand to be carried out only up to at most a second limit IGDSOLLLIM1LIM2. This limit for limiting results in the effects of the engine strain control module being suppressed in the range of very low transmission gear ratios, for which the influence of the transmission variation on the engine load reduces.
If KR is not selected (drive):

$$IGDSOLLLIM1LIM2=f(IG)$$

f=#FNIGDSOLLLIM1LIM2

$$IGDSOLLLIM1=MAX(IGDSOLLLIM1;\;IGDSOLLLIM1LIM2)$$

$$IGDSOLL2=MIN(IGDSOLL1;\;IGDSOLLLIM1)$$

If KR is selected (reverse):

$$IGDSOLLLIM1LIM2=-f(-IG)$$

f=#FNIGDSOLLLIM1LIM2

$$IGDSOLLLIM1=MIN(IGDSOLLLIM1;\;IGDSOLLLIM1LIM2)$$

$$IGDSOLL2=MAX(IGDSOLL1;\;IGDSOLLLIM1)$$

3.3.3. Limiting by Transmission Limits

In order to calculate the final required transmission gear ratio change IGDSOLL as an input variable for the transmission control module, IGDSOLL2 is also reduced on approaching the transmission limits, in order to avoid an abrupt reduction in the acceleration.

In addition, limiting is carried out on the basis of the maximum possible variator variation rate #IVDMAX, in order to keep the engine strain control within the physically possible control range.

Stopping on reaching the upper gear ratio limit:

$$IGDSOLLIGMAX=f(IG)$$

f=#FNIGDSOLLIGMAX

Stopping on reaching the lower gear ratio limit:

$$IGDSOLLIGMIN=f(IG)$$

f=#FNIGDSOLLIGMIN

Transmission variation rate at the maximum variator Variation Rate:

$$IGDSOLLIVDMAX=\#IVDMAX/Abs(IB)$$

The range gear ratio IB is the ratio of the variator variation rate and the transmission variation rate.
Maximum value for the transmission variation rate:

$$IGDSOLLMAX=MIN(IGDSOLLIGMAX,\;IGDSOLLIVDMAX)$$

Minimum value for the transmission variation rate:

$$IGDSOLLMIN=MAX(IGDSOLLIGMIN,\;-IGDSOLLIVDMAX)$$

Calculation of IGDSOLL:
If IGDSOLL2 is greater than IGDSOLLMAX:

$$IGDSOLL=IGDSOLLMAX$$

If IGDSOLL2 is less than IGDSOLLMIN:

$$IGDSOLL=IGDSOLLMIN$$

If IGDSOLL2 is between IGDSOLLMAX and IGDSOLLMIN:

$$IGDSOLL=IGDSOLL2$$

4. Transmission Control Module

The transmission control module uses the gear ratio change demand IGDSOLL from the driving control module and any transmission disconnection demand that may be present (neutral selection or transmission disconnection during braking etc.) to calculate the control signals that are suitable for the clutches and the variator. The calculation comprises a number of logic paths, which are carried out depending on the clutch state or the clutch demand (transmission disconnection) and after initialization.

The logic section "transmission control for the entered range" carries out transmission control for normal driving. The timing of the range change is controlled by a timer TBW. Since the transmission control systems itself is involved only at the fringe of the method according to the invention, it will not be described in any more detail here.

5. Engine Control Module

The engine control module supplies the output signal (required position XEPSOLL) for electrohydraulic control rod operation. The present example relates to a diesel engine with RQV control.

5.1. Control Rod Position as a Function of the Throttle Control Pedal Position

During normal driving and when Tempomat operation is overridden by throttle control pedal operation (see also 6.4 and 6.5 below), the control rod position is calculated directly from the throttle control pedal position. This direct relationship has been found to be particularly advantageous for the subjective vehicle feel (the engine "follows" the throttle control pedal). See "normal driving" in FIG. 3.

Figure 13:
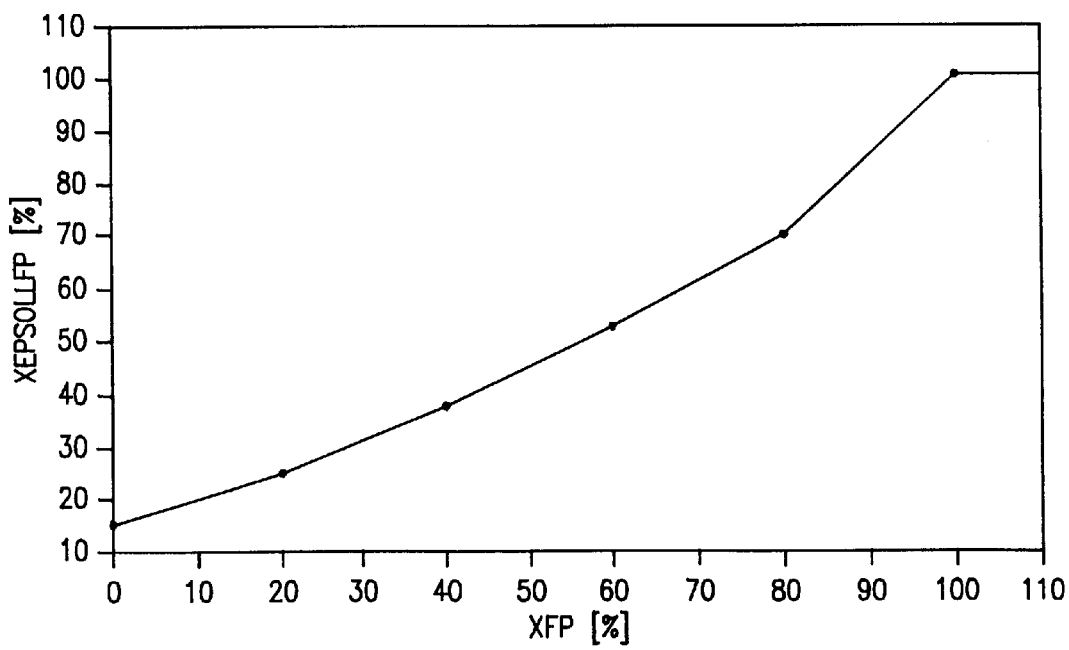
Figure 14:
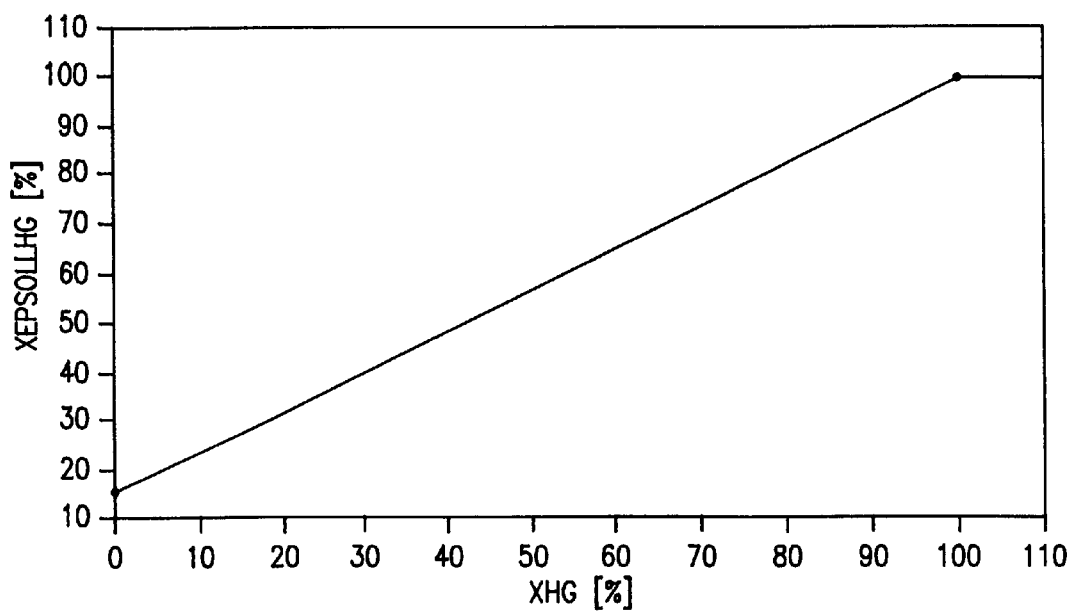

D(XEPSOLL=XEPSOLLFP)
If FLKR is set (crawling):

$$XEPSOLLFP=f(XFP)$$

f=#FNXEPSOLLFPKR see FIG. 13
If FLKR is not set (normal driving):

$$XEPSOLLFP=f(XFP)$$

f=#FNXEPSOLLFP similar to FIG. 13

5.2. Engine Operation During Braking

During braking in operation and when a range is entered (KUSTABC set) the control rod position is set to the minimum until the vehicle is virtually stationary or is rolling backward. This prevents the engine from driving against the brakes when running below the idle speed set for normal operation.

$$XEPSOLL=0$$

When brake disconnection is being carried out, the vehicle is stationary or Tempomat operation is still set (very brief touching of the brake pedal) or when manual throttle control disconnection has been activated, the normal engine control functions are carried out even during braking.

5.3. Manual Throttle Control Operation

During manual throttle control operation, the required control rod position is calculated as a function of the manual throttle control position XHG.

$$XEPSOLLHG=f(XHG)$$

f=#FNXEPSOLLHG
see FIG. 13
If FLHG is not set and
if XHG is greater than #XHGLIM1 and
if XEPSOLLHG is greater than XEPSOLLold:
  FLHG is set
  The condition "XHG greater than #XHGLIM1" records the position of the manual throttle control lever and thus the driver's demand; the condition "XEPSOLLHG greater than XEPSOLLold" ensures that the throttle angle is not suddenly closed at the start of manual throttle control operation. If the manual throttle control flag is set once the above conditions have been applied, the control rod is actuated in the manual throttle control mode.
If FLHG is set and
if XHG is less than #XHGLIM2 and
if XEPSOLLFP is less than #XEPLIMHG:
  FLHG is deleted
  The condition "XEPSOLLFP less than #XEPLIMHG" avoids the throttle angle being suddenly opened at the end of manual throttle control operation.

$$XEPSOLL=XEPSOLLHG$$

5.4. Engine Operation in the Tempomat Function

During Tempomat operation (FLTM set and manual throttle control operation not selected), the control rod is automatically controlled by a number of functions.

5.4.1. Control Rate on Reaching the Required Acceleration

The aim of the following functions is to move the control rod sufficiently quickly that the required acceleration is achieved (taking account of the current transmission variation).

Engine rotation speed gradient corresponding to the required acceleration:

$$NHADSOLL1=NABDSOLLTM/IG$$

Engine rotation speed gradient required to achieve the required acceleration:

$$NHADSOLL2=NHADSOLL1-IGDSOLL*NHA/IG$$

Control rod control rate to achieve the required acceleration:

$$XEPDMIN=f(NHADSOLL2)$$

f=#FNXEPDMIN

5.4.2. Control Rate as a Function of the Required Acceleration

This function is used essentially for automatically "reducing the throttle angle" when the required acceleration is negative. This is based on the required input rotation speed gradient from 6.4.1, which corresponds to the required Tempomat acceleration.
Required speed of the control rod:

$$XEPDSOLL1=f(NHADSOLL1)$$

f=#FNXEPDSOLL1, a linear function with limits,

5.4.3. Position of the Control Rod From the Transmission Gear Ratio and the Engine Rotation Speed In order to achieve good engine control response, the control rod position is always kept in the vicinity of the RQV control limits, between a minimum permissible control rod position XEPMIN and a maximum permissible control rod position XEPMAX.

Minimum Permissible Control Rod Position
A first minimum position of the control rod is predetermined as a function of the transmission gear ratio. This allows the power capacity of the engine to be matched to the speed of travel.

$$XEPMIN1=f(Abs(IG))$$

f=#FNXEPMIN1
A second minimum position results from the control rod position always being kept in the vicinity of the RQV control limits, in order to achieve good engine control response. A maximum selection, if required, is made from these two minimum positions.

$$XEPMIN=f(NMOT)$$

f=#FNXEPMIN $$XEPMIN'=MAX(XEPMIN1, XEPMIN)$$

Maximum permissible control rod position:

$$XEPMAX=f(NMOT)$$

FNXEPMAX

5.4.4. Resultant Control Rod Position

Movement Rate of the Control Rod
The movement rate required to achieve the minimum position XEPMIN1 (see 3.2.2) is limited such that the minimum position is not overshot.
If XEPDMIN1 is greater than XEPMIN1−XEPSOLLold:

$$XEPDMIN1=XEPMIN1-XEPSOLLold$$

The lower value of XEPDMIN and the movement rate XEPSoll1 is selected for the control rate XEPSOLL:

If XEPDMIN is less than XEPDSOLL1:

XEPDSOLL=XEPDMIN

If XEPDMIN is greater than XEPDSOLL1:

XEPDSOLL=XEPDSOLL1

Limiting XEPDMIN1 downward ensures that the minimum position XEPMIN1 is not undershot:
If XEPDMIN1 is greater than XEPDSOLL:

XEPDSOLL=XEPDMIN1

Required Control Rod Position

A first basic value for the required control rod position is obtained by addition of the required speed to the current required position.

XEPSOLL1=XEPSOLLold+XEPDSOLL

Limiting the basic value XEPSOLL1 using XEPMAX and −MIN (6.4.3) gives the resultant required position for Tempomat operation XEPSOLLTM:
If XEPSOLL1 is greater than XEPMAX:

XEPSOLLTM=XEPMAX

If XEPSOLL1 is less than XEPMIN:

XEPSOLLTM=XEPMIN

If XEPSOLL1 is between XEPMAX and XEPMIN:

XEPSOLLTM=XEPSOLL1

For the final required position XEPSOLL, the maximum of XEPSOLLTM and XEPFP (6.4.1) is selected, in order to allow the Tempomat mode to be overridden by throttle control pedal operation
If XEPSOLLFP is greater than XEPSOLLTM:

XEPSOLL=XEPSOLLFP

If XEPSOLLFP is less than XEPSOLLTM:

XEPSOLL=XEPSOLLTM

If Tempomat is not activated, the resultant required position for Tempomat operation XEPSOLLTM is initialized accordingly:

XEPSOLLTM=XEP 5.5. Actuation of the Control Rod

In a diesel engine with a conventional controller (for example using the RQV response) and an electrohydraulically operated control rod, the actuation is provided via a pulse-width-modulated signal. The pulse width is calculated as a function of the required position. This form of actuation is equivalent to that used in a conventional variable-speed transmission with an electronic throttle control pedal (electronic throttle control), and will thus not be described in any more detail.

By virtue of the method according to the invention, it is thus possible to use a conventionally equipped drive engine. If the Tempomat function is dispensed with, it is even possible, thanks to the invention, to operate the control rod of the diesel engine purely mechanically.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A method for controlling a vehicle drive unit comprising a drive engine and a transmission having a continuously variable gear ratio, in the case of which method command signals and state signals are used to generate control signals for the drive engine and for the transmission, with a required gradient being determined for the transmission gear ratio, distinguished by the sequence of the following steps:

a) the required vehicle acceleration (ASOLL) and the output drive rotation speed gradient (NABDSOLL) are calculated from a throttle control lever position (XFP, XHG) and the current speed of travel (VFZ) by means of a family of characteristics (#ASOLLF, #ASOLLR), b) a required transmission variation (IGDSOLL1) is calculated from the required vehicle acceleration (ASOLL) and the current rotation speed (NMOT) of the drive engine, c) a limited required transmission variation (IGDSOLL) is determined from the required transmission variation (IGDSOLL1) such that the engine rotation speed (NMOT) does not fall below a value which is a function (NMOTMMAX) of the position of the power control element (XEP) of the drive engine, d) the continuously variable transmission is varied in accordance with (IGDSOLL);

e) the actuation parameter (XEPSOLL) for the power control element of the drive engine is obtained directly from the throttle control lever position (XFP, XHG).

2. The method as claimed in claim 1, wherein further families of characteristics (#ASOLLFKR, #ASOLLRKR) or calculation functions (#FNASOLLB, #FNASOLLTM) are used to calculate the required vehicle acceleration (ASOLL) on the basis of command signals (FLKR, FLTM).

3. The method as claimed in claim 2, wherein, when the Tempomat function is switched on, the current speed of the vehicle (VFZ) is stored as a required value (VSOLLTMMEM) and, as a consequence of this, the required vehicle acceleration (ASOLLTM) and the output drive rotation speed gradient (NABDSOLLTM) are calculated as a function of the speed error (VSOLLTMMEM−VFZ), and the required transmission variation (IGDSOLL) is calculated from this, taking account of the current engine operating state.

4. The method as claimed in claim 1 (e), wherein the drive engine is a diesel engine having a control rod as the power control element, and wherein its actuation parameter is the required position (XEPSOLL, XEPSOLLFP) of the control rod.

5. The method as claimed in claim 1 for a vehicle drive unit which, in addition to the vehicle, also drives a power takeoff shaft, and with a throttle control pedal and a manual throttle control being provided as the throttle control lever, wherein, when the manual throttle control is activated, its position (XHG) determines only the actuation parameter (XEPSOLL) for the drive engine, and the position (XFP) of the throttle control pedal causes only a variation of the transmission gear ratio (IG).

6. The method as claimed in claim 1 (b), wherein the gradient of the rotation speed (NMOTD) of the drive engine is also taken into account in order to take account of the current rotation speed (NMOT) of the drive engine when determining the required transmission variation (IGDSOLL1).

7. The method as claimed in claim 1, wherein a stationary position control process is provided, which is carried out with the following steps:
   a) when the throttle control lever is not being operated and the vehicle is stationary for the first time, the required stationary position of the vehicle (NABI) is defined by initialization of the value of the integral,
   b) calculation of the error from the required stationary position of the vehicle (NABI) by integration of the output drive rotation speed (NAB),
   c) a required output drive rotation speed gradient (NABDSOLL) is calculated from the error from the required stationary position of the vehicle (NABI), by means of a function (#FNNABDSOLL) and, possibly, also from the output drive rotation speed (NAB) and a further function (#FNNABDSOLL1),
   d) the stationary position control process is ended by operating the throttle control lever.

8. The method as claimed in claim 1, wherein the required transmission variation (IGDSOLL) limiting is carried out in the following steps:
   a) the engine rotation speed (NMOTMMAX) which corresponds to the desired engine operating point and which should not be undershot is calculated from the position of the power control element of the drive engine (XEP) by means of a function (#FNXEPNMOT),
   b) a control error (DNMOT) is formed from the current engine rotation speed (NMOT) and the desired engine rotation speed (NMOTMMAX),
   c) a required engine rotation speed gradient (NMOTDMIN; NMOTDMIN1) is determined from the control error (DNMOT) using a predetermined function (#FNNMOTDMIN1),
   d) a gradient control error (DNMOTDMIN) is determined from the actual engine rotation speed gradient (DNMOT) and the required engine rotation speed gradient (NMOTDMIN; NMOTDMIN1), and a limit value for the first derivative of the required transmission variation (IGDDSOLLLIM) is calculated from this using a function (#FNIGDDLIM), and is used for limiting,
   e) the limit value (IGDSOLLLIM1) is calculated from the required transmission variation (IGDDSOLLLIM) by integration, and (IGDSOLL1) is then limited to a maximum value of (IGDSOLLLIM1).

9. The method as claimed in claim 8, wherein, in addition to step c) of claim 8:
   a) a minimum engine rotation speed (NMOTMIN) is determined as a predetermined function (#FNNMOTMIN) of the transmission gear ratio (IG) or of the vehicle speed VFZ,
   b) a rotation speed error ((downward)) (NMOT−NMOTMIN) is formed from the current engine rotation speed (NMOT) and the minimum engine rotation speed (NMOTMIN),
   c) an engine rotation speed gradient (NMOTDMIN2) is formed from the control error (NMOT−NMOTMIN) using a further predetermined function (#FNNMOTDMIN2),
   d) the greater of the two engine rotation speed gradients (NMOTDMIN1, NMOTDMIN2) is selected as the final engine rotation speed gradient.

10. The method in claim 1, wherein the require transmission variation (IGDSOLL1) is reduced as it approaches the range boundaries.

11. The method as in claim 1, wherein the output drive rotation speed (NAB) is determined from rotation speeds of members of the summing epicyclic transmission.

* * * * *